(12) United States Patent
Farrugia et al.

(10) Patent No.: US 12,378,360 B2
(45) Date of Patent: Aug. 5, 2025

(54) POLYAMIDE PARTICLES AND METHODS OF PRODUCTION AND USES THEREOF

(71) Applicant: Xerox Corporation, Norwalk, CT (US)

(72) Inventors: Valerie M. Farrugia, Oakville (CA); Yulin Wang, Oakville (CA); Chu Yin Huang, Mississauga (CA); Carolyn Patricia Moorlag, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 18/517,991

(22) Filed: Nov. 22, 2023

(65) Prior Publication Data

US 2024/0092972 A1    Mar. 21, 2024

Related U.S. Application Data

(63) Continuation of application No. 16/946,623, filed on Jun. 30, 2020, now Pat. No. 11,866,552.

(60) Provisional application No. 62/897,522, filed on Sep. 9, 2019.

(51) Int. Cl.
| | |
|---|---|
| *C08G 69/46* | (2006.01) |
| *B29B 9/16* | (2006.01) |
| *C08J 3/215* | (2006.01) |
| *C08L 77/00* | (2006.01) |

(52) U.S. Cl.
CPC ............... *C08G 69/46* (2013.01); *B29B 9/16* (2013.01); *C08J 3/215* (2013.01); *C08L 77/00* (2013.01); *B29B 2009/163* (2013.01); *C08J 2377/00* (2013.01)

(58) Field of Classification Search
CPC ...... C08G 69/46; B29B 9/16; B29B 2009/163; C08J 3/215; C08J 2377/00; C08L 77/00
See application file for complete search history.

(56) References Cited

U.S. PATENT DOCUMENTS

| | | | | |
|---|---|---|---|---|
| 11,787,937 | B2 * | 10/2023 | Birau | C08J 3/215 524/358 |
| 11,866,552 | B2 * | 1/2024 | Farrugia | C08J 3/215 |
| 12,110,380 | B2 * | 10/2024 | Claridge | B33Y 10/00 |
| 2018/0105669 | A1 * | 4/2018 | Otsubo | C08K 3/04 |

(Continued)

FOREIGN PATENT DOCUMENTS

CN    107254163 A  * 10/2017 ........... A61K 9/1611

OTHER PUBLICATIONS

English language machine translation for CN 107254163. (Year: 2017).*

*Primary Examiner* — Angela C Scott
(74) *Attorney, Agent, or Firm* — Vorys, Sater, Seymour and Pease LLP

(57) ABSTRACT

A method for producing polyamide particles may include: mixing a mixture comprising a polyamide, a carrier fluid that is immiscible with the polyamide, and nanoparticles at a temperature greater than a melting point or softening temperature of the polyamide and at a shear rate sufficiently high to disperse the polyamide in the carrier fluid; cooling the mixture to below the melting point or softening temperature of the polyamide to form solidified particles comprising polyamide particles having a circularity of 0.90 or greater and that comprise the polyamide and the nanoparticles associated with an outer surface of the polyamide particles; and separating the solidified particles from the carrier fluid.

20 Claims, 17 Drawing Sheets

(56) References Cited

U.S. PATENT DOCUMENTS

| | | | | |
|---|---|---|---|---|
| 2021/0069958 A1* | 3/2021 | Farrugia | ................ | B29B 9/12 |
| 2023/0407087 A1* | 12/2023 | Birau | ................ | C08J 3/12 |
| 2024/0026104 A1* | 1/2024 | Jamali | ................ | C08J 3/20 |
| 2024/0279465 A1* | 8/2024 | Farrugia | ................ | C08J 3/124 |

* cited by examiner

POLYAMIDE PARTICLES AND METHODS OF PRODUCTION AND USES THEREOF

TECHNICAL FIELD

The present disclosure relates to polyamide particles and methods of making such particles. Such particles, especially the highly spherical polyamide particles, may be useful, among other things, as starting material for additive manufacturing.

BACKGROUND

Three-dimensional (3-D) printing, also known as additive manufacturing, is a rapidly growing technology area. Although 3-D printing has traditionally been used for rapid prototyping activities, this technique is being increasingly employed for producing commercial and industrial objects, which may have entirely different structural and mechanical tolerances than do rapid prototypes.

3-D printing operates by depositing either (a) small droplets or streams of a melted or solidifiable material or (b) powder particulates in precise deposition locations for subsequent consolidation into a larger object, which may have any number of complex shapes. Such deposition and consolidation processes typically occur under the control of a computer to afford layer-by-layer buildup of the larger object. In a particular example, consolidation of powder particulates may take place in a 3-D printing system using a laser to promote selective laser sintering (SLS). Incomplete interlayer fusion may result in structural weak points, which may be problematic for printing objects having exacting structural and mechanical tolerances.

Powder particulates usable in 3-D printing include thermoplastic polymers, including thermoplastic elastomers, metals and other solidifiable substances. Although a wide array of thermoplastic polymers are known, there are relatively few having properties suitable for use in 3-D printing, particularly when using powder bed fusion (PBF). Additive manufacturing methods using powdered materials include PBF, selective laser sintering (SLS), selective heat sintering (SHM), selective laser melting (SLM), electron beam melting (EBM), binder jetting, and multi jet fusion (MJF). In the SLS printing method, the particles are fused together by the energy from a high-powered laser. Typical thermoplastic polymers suitable for use in 3-D printing include those having sharp melting points and recrystallization points about 20° C. to 50° C. below the melting point. This difference may allow more effective coalescence between adjacent polymer layers to take place, thereby promoting improved structural and mechanical integrity.

For good printing performance to be realized using powder particulates, particularly polymer powder particulates, the powder particulates need to maintain good flow properties in the solid state. Flow properties may be evaluated, for example, by measuring the fraction of powder particulates from a sample that are able to pass through a standard sieve of a specified size and/or measuring of the angle of repose. High fractions of sievable powder particulates may be indicative of the particulates existing as non-agglomerated, substantially individual particulates, which may be characteristic of ready powder flow. Lower values of the angle of repose, in addition, may be characteristic of ready powder flow. A relatively narrow particle size distribution and regularity of the particulate shape in a sample may also aid in promoting good powder flow performance.

Commercial powder particulates are oftentimes obtained by cryogenic grinding or precipitation processes, which may result in irregular particulate shapes and wide particle size distributions. Irregular particulate shapes may result in poor powder flow performance during 3-D printing processes. In addition, powder particulates having shape irregularity, especially those obtained from current commercial processes, may afford poor packing efficiency following deposition and consolidation, thereby resulting in extensive void formation in a printed object due to the powder particulates not packing closely together during deposition. Wide particle size distributions may be similarly problematic in this regard. Although poor powder flow performance may be addressed to some degree through dry blending with fillers and flow aids, these techniques may have limited effectiveness with softer polymer materials, such as elastomers, due to particulate aggregation.

SUMMARY OF THE INVENTION

The present disclosure relates to polyamide particles and methods of making such particles. Such particles, especially the highly spherical polyamide particles, may be useful, among other things, as starting material for additive manufacturing.

Described herein is a method comprising: mixing a mixture comprising a polyamide, a carrier fluid that is immiscible with the polyamide, and nanoparticles at a temperature greater than a melting point or softening temperature of the polyamide and at a shear rate sufficiently high to disperse the polyamide in the carrier fluid; cooling the mixture to below the melting point or softening temperature of the polyamide to form solidified particles comprising polyamide particles having a circularity of 0.90 or greater and that comprise the polyamide and the nanoparticles associated with an outer surface of the polyamide particles; and separating the solidified particles from the carrier fluid.

Described herein is a composition comprising: particles comprising polyamide particles having a circularity of 0.90 or greater and that comprise a polyamide and nanoparticles associated with an outer surface of the polyamide particles.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
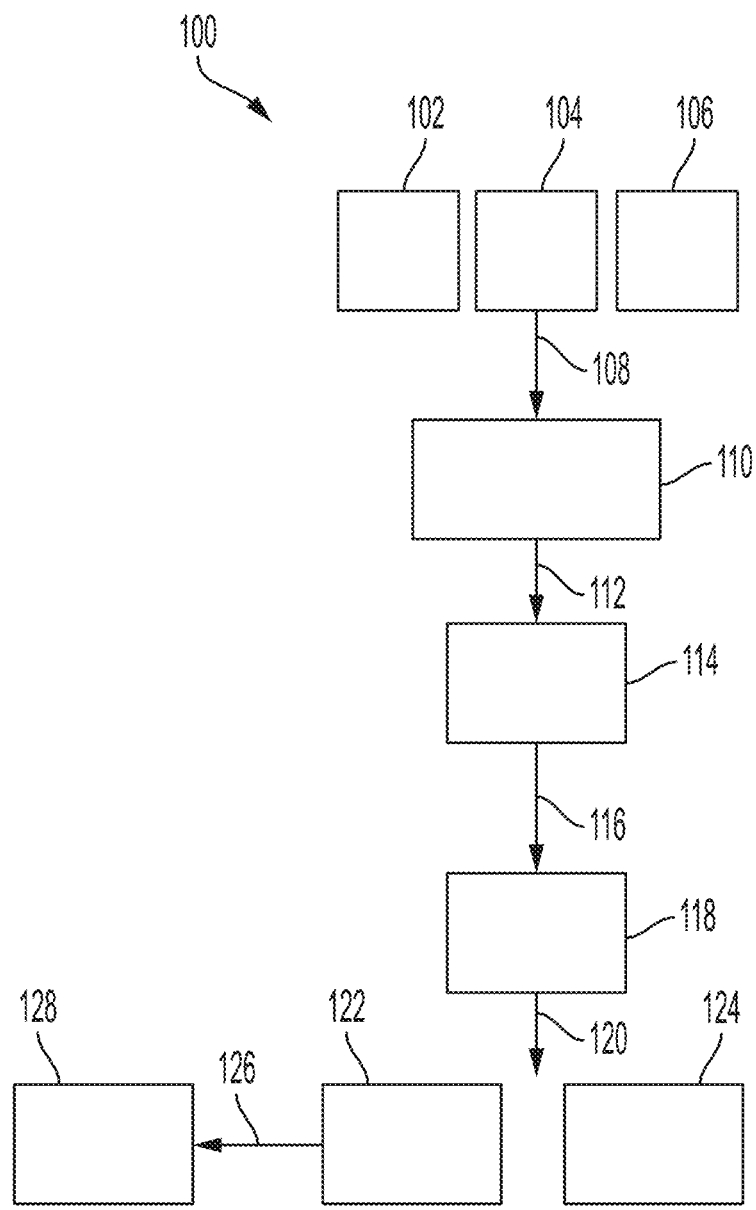
FIG. 1 is a flow chart of a nonlimiting example method 100 of the present disclosure.

The present disclosure relates to polyamide particles and methods of making such particles. Such particles, especially the highly spherical polyamide particles, may be useful, among other things, as starting material for additive manufacturing.

More specifically, the polyamide particles described herein are produced by melt emulsification methods where a polyamide is dispersed as a melt in a carrier fluid that is immiscible with the polyamide. A sufficient amount of shear is used to cause the polyamide melt to form droplets in the carrier fluid. Emulsion stabilizers (e.g., nanoparticles and/or surfactants) effect the surface tension at the phase interface between the carrier fluid and the polyamide melt. Once the melt emulsification process is complete, the dispersion is cooled, which solidifies the polymer into polyamide particles.

Without being limited by theory, during the melt emulsification process, the emulsion stabilizers primarily reside at the interface between the polymer melt and the carrier fluid. As a result, when the mixture is cooled, the emulsion stabilizers remain at said interface. Advantageously, the emulsion stabilizers at a surface of the resultant particles may assist with the flow properties of the resultant particles.

As described previously, traditional methods of forming polyamide particles with good flowability include at least two steps including first forming (e.g., by cryogenic grinding or precipitation processes) and purifying the particles and second coating the particles to some degree with a flow enhancing agent like nanoparticle silica, carbon black, or PTFE particles. The methods described herein advantageously produce polyamide particles with a coating that enhances flowability of the particles in one process.

Further, without limitation by theory, the methods of the present disclosure appear to produce particles with a more homogeneous coverage of emulsion stabilizers, which may further improve flowability. Enhanced flowability is especially advantageous in additive manufacturing applications like 3-D printing.

Definitions and Test Methods

As used herein, the term "immiscible" refers to a mixture of components that, when combined, form two or more phases that have less than 5 wt % solubility in each other at ambient pressure and at room temperature or the melting point of the component if it is solid at room temperature. For example, polyethylene oxide having 10,000 g/mol molecular weight is a solid at room temperature and has a melting point of 65° C. Therefore, said polyethylene oxide is immiscible with a material that is liquid at room temperature if said material and said polyethylene oxide have less than 5 wt % solubility in each other at 65° C.

As used herein, the term "oxide" refers to both metal oxides and non-metal oxides. For purposes of the present disclosure, silicon is considered to be a metal.

As used herein, the terms "associated," "association," and grammatical variations thereof between emulsion stabilizers and a surface refers to chemical bonding and/or physical adherence of the emulsion stabilizers to the surface. Without being limited by theory, it is believed that the associations described herein between polymers and emulsion stabilizers are primarily physical adherences via hydrogen bonding and/or other mechanisms. However, chemical bonding may be occurring to some degree.

As used herein, the term "embed" relative to nanoparticles and a surface of a polymer particle refers to the nanoparticle being at least partially extending into the surface such that polymer is in contact with the nanoparticle to a greater degree than would be if the nanoparticle were simply laid on the surface of the polymer particle.

Herein, D10, D50, D90, and diameter span are primarily used herein to describe particle sizes. As used herein, the term "D10" refers to a diameter at which 10% of the sample (on a volume basis unless otherwise specified) is comprised of particles having a diameter less than said diameter value. As used herein, the term "D50" refers to a diameter at which 50% of the sample (on a volume basis unless otherwise specified) is comprised of particles having a diameter less than said diameter value. As used herein, the term "D90" refers to a diameter at which 90% of the sample (on a volume basis unless otherwise specified) is comprised of particles having a diameter less than said diameter value.

As used herein, the terms "diameter span" and "span" and "span size" when referring to diameter provides an indication of the breadth of the particle size distribution and is calculated as (D90−D10)/D50 (again each D-value is based on volume, unless otherwise specified).

Particle size can be determined by light scattering techniques using a Malvern MASTERSIZER™ 3000 or analysis of optical digital micrographs. Unless otherwise specified, light scattering techniques are used for analyzing particle size.

For light scattering techniques, the control samples were glass beads with a diameter within the range of 15 μm to 150 μm under the tradename Quality Audit Standards QAS4002™ obtained from Malvern Analytical Ltd. Samples were analyzed as dry powders, unless otherwise indicated. The particles analyzed were dispersed in air and analyzed using the AERO S dry powder dispersion module with the MASTERSIZER™ 3000. The particle sizes were derived using instruments software from a plot of volume density as a function of size.

As used herein, the terms "circularity" and "sphericity" relative to the particles refer to how close the particle is to a perfect sphere. To determine circularity, optical microscopy images are taken of the particles. The perimeter (P) and area (A) of the particle in the plane of the microscopy image is calculated (e.g., using a SYSMEX FPIA 3000 particle shape and particle size analyzer, available from Malvern Instruments). The circularity of the particle is $C_{EA}/P$, where $C_{EA}$ is the circumference of a circle having the area equivalent to the area (A) of the actual particle.

As used herein, the term "sintering window" refers to the difference between the melting temperature (Tm) onset and the crystallization temperature (Tc) onset, or (Tm−Tc) onset. Tm, Tm (onset), Tc, and Tc (onset) are determined by differential scanning calorimetry per ASTM E794-06(2018) with a 10° C./min ramp rate and a 10° C./min cool rate.

As used herein, the term "shear" refers to stirring or a similar process that induces mechanical agitation in a fluid.

As used herein, the term "aspect ratio" refers to length divided by width, wherein the length is greater than the width.

The melting point of a polymer, unless otherwise specified, is determined by ASTM E794-06(2018) with 10° C./min ramping and cooling rates.

The softening temperature or softening point of a polymer, unless otherwise specified, is determined by ASTM D6090-17. The softening temperature can be measured by using a cup and ball apparatus available from Mettler-Toledo using a 0.50 gram sample with a heating rate of 1° C./min.

Angle of repose is a measure of the flowability of a powder. Angle of repose measurements were determined using a Hosokawa Micron Powder Characteristics Tester PT-R using ASTM D6393-14 "Standard Test Method for Bulk Solids" Characterized by Carr Indices."

Hausner ratio ($H_r$) is a measure of the flowability of a powder and is calculated by $H_r=\rho_{tap}/\rho_{bulk}$, where $\rho_{bulk}$ is the bulk density per ASTM D6393-14 and p tap is the tapped density per ASTM D6393-14.

As used herein, the term "embed" relative to nanoparticles and a surface of a polymer particle refers to the nanoparticles being at least partially extending into the surface such that polymer is in contact with the nanoparticles to a greater degree than would be if the nanoparticles were simply laid on the surface of the polymer particle.

As used herein, viscosity of carrier fluids are the kinematic viscosity at 25° C., unless otherwise specified, measured per ASTM D445-19. For commercially procured carrier fluids (e.g., PDMS oil), the kinematic viscosity data cited herein was provided by the manufacturer, whether measured according to the foregoing ASTM or another standard measurement technique.

Polyamide Particles and Methods of Making

FIG. 1 is a flow chart of a nonlimiting example method 100 of the present disclosure. The polyamide 102, carrier fluid 104, and emulsion stabilizer 106 are combined 108 to produce a mixture 110. The components 102, 104, and 106 can be added in any order and include mixing and/or heating during the process of combining 108 the components 102, 104, and 106.

The mixture 110 is then processed 112 by applying sufficiently high shear to the mixture 110 at a temperature greater than the melting point or softening temperature of the polyamide 102 to form a melt emulsion 114. Because the temperature is above the melting point or softening temperature of the polyamide 102, the polyamide 102 becomes a polymer melt. The shear rate should be sufficient enough to disperse the polymer melt in the carrier fluid 104 as droplets (i.e., the polymer emulsion 114). Without being limited by theory, it is believed that, all other factors being the same, increasing shear should decrease the size of the droplets of the polymer melt in the carrier fluid 104. However, at some point there may be diminishing returns on increasing shear and decreasing droplet size or may be disruptions to the droplet contents that decrease the quality of particles produced therefrom.

Examples of mixing apparatuses used for the producing melt emulsion 114 include, but are not limited to, extruders (e.g., continuous extruders, batch extruders and the like), stirred reactors, blenders, reactors with inline homogenizer systems, and the like, and apparatuses derived therefrom.

The melt emulsion 114 inside and/or outside the mixing vessel is then cooled 116 to solidify the polymer droplets into polyamide polymer particles (also referred to as solidified polyamide polymer particles). The cooled mixture 118 can then be treated 120 to isolate the polyamide polymer particles 122 from other components 124 (e.g., the carrier fluid 104, excess emulsion stabilizer 106, and the like) and wash or otherwise purify the polyamide polymer particles 122. The polyamide polymer particles 122 comprise the polyamide polymer 102 and at least a portion of the emulsion stabilizer 106 coating the outer surface of the polyamide polymer particles 122. Emulsion stabilizers 106, or a portion thereof, may be deposited as a uniform coating on the polyamide polymer particles 122. In some instances, which may be dependent upon non-limiting factors such as the temperature (including cooling rate), the type of polyamide polymer 102, and the types and sizes of emulsion stabilizers 106, the nanoparticles of emulsion stabilizers 106 may become at least partially embedded within the outer surface of polyamide polymer particles 122 in the course of becoming associated therewith. Even without embedment taking place, at least the nanoparticles within emulsion stabilizers 106 may remain robustly associated with polyamide polymer particles 122 to facilitate their further use In contrast, dry blending already formed polyamide particulates (e.g., formed by cryogenic grinding or precipitation processes) with a flow aid like silica nanoparticles does not result in a robust, uniform coating of the flow aid upon the polyamide particulates.

Advantageously, carrier fluids and washing solvents of the systems and methods described herein (e.g., method 101) can be recycled and reused. One skilled in the art will recognize any necessary cleaning of used carrier fluid and solvent necessary in the recycling process.

The polyamide 102 and carrier fluid 104 should be chosen such that at the various processing temperatures (e.g., from room temperature to process temperature) the polyamide 102 and carrier fluid 104 are immiscible. An additional factor that may be considered is the differences in (e.g., a difference or a ratio of) viscosity at process temperature between the molten polyamide 102 and the carrier fluid 104. The differences in viscosity may affect droplet breakup and particle size distribution.

Examples of polyamides 102 include, but are not limited to, polycaproamide (nylon 6, polyamide 6, or PA6), poly (hexamethylene succinamide) (nylon 4,6, polyamide 4,6, or PA4,6), polyhexamethylene adipamide (nylon 6,6, polyamide 6,6, or PA6,6), polypentamethylene adipamide (nylon 5,6, polyamide 5,6, or PA5,6), polyhexamethylene sebacamide (nylon 6,10, polyamide 6,10, or PA6,10), polyundecamide (nylon 11, polyamide 11, or PA11), polydodecamide (nylon 12, polyamide 12, or PA12), and polyhexamethylene terephthalamide (nylon 6T, polyamide 6T, or PA6T), nylon 10,10 (polyamide 10,10 or PA10,10), nylon 10,12 (polyamide 10,12 or PA10,12), nylon 10,14 (polyamide 10,14 or PA10,14), nylon 10,18 (polyamide 10,18 or PA10,18), nylon 6,18 (polyamide 6,18 or PA6,18), nylon 6,12 (polyamide 6,12 or PA6,12), nylon 6,14 (polyamide 6,14 or PA6,14), nylon 12,12 (polyamide 12,12 or PA12,12), and the like, and any combination thereof. Copolyamides may also be used. Examples of copolyamides include, but are not limited to, PA 11/10,10, PA 6/11, PA 6,6/6, PA 11/12, PA 10,10/10,12, PA 10,10/10,14, PA 11/10,36, PA 11/6,36, PA 10,10/10,36, PA 6T/6,6, and the like, and any combination thereof. A polyamide followed by a first number comma second number is a polyamide having the first number of backbone carbons between the nitrogens for the section having no pendent =O and the second number of backbone carbons being between the two nitrogens for the section having the pendent =O. By way of nonlimiting example, nylon 6,10 is [NH—(CH$_2$)$_6$—NH—CO—(CH$_2$)$_8$—CO]$_n$. A polyamide followed by number(s) backslash number(s) are a copolymer of the polyamides indicated by the numbers before and after the backslash. Examples of polyamide elastomers include, but are not limited to, polyesteramide, polyetheresteramide, polycarbonate-esteramide, and polyether-block-amide elastomers.

The polyamides 102 may have a melting point or softening temperature of about 50° C. to about 450° C. (or about 50° C. to about 125° C., or about 100° C. to about 175° C., or about 150° C. to about 280° C., or about 200° C. to about 350° C., or about 300° C. to about 450° C.).

The polyamides 102 may have a glass transition temperature (ASTM E1356-08(2014) with 10° C./min ramping and cooling rates) of about −50° C. to about 400° C. (or about −50° C. to about 0° C., or about −25° C. to about 50° C., or about 0° C. to about 150° C., or about 100° C. to about 250° C., or about 150° C. to about 300° C., or about 200° C. to about 400° C.).

The polyamides 102 may optionally comprise an additive. Typically, the additive would be present before addition of the polyamides 102 to the mixture 110. Therefore, in the polyamide melt droplets and resultant polyamide particles, the additive is dispersed throughout the polyamide. Accordingly, for clarity, this additive is referred to herein as an "internal additive." The internal additive may be blended with the polyamide just prior to making the mixture 110 or well in advance.

When describing component amounts in the compositions described herein (e.g., the mixture 110 and polyamide particles 122), a weight percent based on the polyamide 102 not inclusive of the internal additive. For example, a composition comprising 1 wt % of emulsion stabilizer by weight of 100 g of a polyamide 102 comprising 10 wt % internal additive and 90 wt % polyamide is a composition comprising 0.9 g of emulsion stabilizer, 90 g of the polyamide, and 10 g of internal additive.

The internal additive may be present in the polyamides 102 at about 0.1 wt % to about 60 wt % (or about 0.1 wt % to about 5 wt %, or about 1 wt % to about 10 wt %, or about 5 wt % to about 20 wt %, or about 10 wt % to about 30 wt %, or about 25 wt % to about 50 wt %, or about 40 wt % to about 60 wt %) of the polyamides 102. For example, the polyamides 102 may comprise about 70 wt % to about 85 wt % of a polyamide and about 15 wt % to about 30 wt % of an internal additive like glass fiber or carbon fiber.

Examples of internal additives include, but are not limited to, fillers, strengtheners, pigments, pH regulators, and the like, and combinations thereof. Examples of fillers include, but are not limited to, glass fibers, glass particles, mineral fibers, carbon fiber, oxide particles (e.g., titanium dioxide and zirconium dioxide), metal particles (e.g., aluminum powder), and the like, and any combination thereof. Examples of pigments include, but are not limited to, organic pigments, inorganic pigments, carbon black, and the like, and any combination thereof Optionally, another thermoplastic polymer may be used in combination with the polyamide. Examples of thermoplastic polymers that may be used in conjunction with one or more polyamides include, but are not limited to, polyurethanes, polyethylenes, polypropylenes, polyacetals, polycarbonates, polybutylene terephthalate (PBT), polyethylene terephthalate (PET), polyethylene naphthalate (PEN), polytrimethylene terephthalate (PTT), polyhexamethylene terephthalate, polystyrenes, polyvinyl chlorides, polytetrafluoroethenes, polyesters (e.g., polylactic acid), polyethers, polyether sulfones, polyetherether ketones, polyacrylates, polymethacrylates, polyimides, acrylonitrile butadiene styrene (ABS), polyphenylene sulfides, vinyl polymers, polyarylene ethers, polyarylene sulfides, polysulfones, polyether ketones, polyamide-imides, polyetherimides, polyetheresters, copolymers comprising a polyether block and a polyamide block (PEBA or polyether block amide), grafted or ungrafted thermoplastic polyolefins, functionalized or nonfunctionalized ethylene/vinyl monomer polymer, functionalized or nonfunctionalized ethylene/alkyl (meth)acrylates, functionalized or nonfunctionalized (meth)acrylic acid polymers, functionalized or nonfunctionalized ethylene/vinyl monomer/alkyl (meth)acrylate terpolymers, ethylene/vinyl monomer/carbonyl terpolymers, ethylene/alkyl (meth)acrylate/carbonyl terpolymers, methylmethacrylate-butadiene-styrene (MBS)-type core-shell polymers, polystyrene-block-polybutadiene-block-poly(methyl methacrylate) (SBM) block terpolymers, chlorinated or chlorosulphonated polyethylenes, polyvinylidene fluoride (PVDF), phenolic resins, poly(ethylene/vinyl acetate)s, polybutadienes, polyisoprenes, styrenic block copolymers, polyacrylonitriles, silicones, and the like, and any combination thereof. Copolymers comprising one or more of the foregoing may also be used in the methods and systems described herein.

If needed, compatibilizers may be used when combining the polyamides with the other thermoplastic polymers. Compatibilizers may improve the blending efficiency and/or efficacy of the polymers. Examples of polymer compatibilizers include, but are not limited to, PROPOLDER™ MPP2020 20 (polypropylene, available from Polygroup Inc.), PROPOLDER™ MPP2040 40 (polypropylene, available from Polygroup Inc.), NOVACOM™ HFS2100 (maleic anhydride functionalized high density polyethylene polymer, available from Polygroup Inc.), KEN-REACT™ CAPS™ L™ 12/L (organometallic coupling agent, available from Kenrich Petrochemicals), KEN-REACT™ CAPOW™ L™ 12/H (organometallic coupling agent, available from Kenrich Petrochemicals), KEN-REACT™ LICA™ 12 (organometallic coupling agent, available from Kenrich Petrochemicals), KEN-REACT™ CAPS™ KPR™ 12/LV (organometallic coupling agent, available from Kenrich Petrochemicals), KEN-REACT™ CAPOW™ KPR™ 12/H (organometallic coupling agent, available from Kenrich Petrochemicals), KEN-REACT™ titanates & zirconates (organometallic coupling agent, available from Kenrich Petrochemicals), VISTAMAXX™ (ethylene-propylene copolymers, available from ExxonMobil), SANTOPRENE™ (thermoplastic vulcanizate of ethylene-propylene-diene rubber and polypropylene, available from ExxonMobil), VISTALON™ (ethylene-propylene-diene rubber, available from ExxonMobil), EXACT™ (plastomers, available from ExxonMobil) EXXELOR™ (polymer resin, available from ExxonMobil), FUSABOND™ M603 (random ethylene copolymer, available from Dow), FUSABOND™ E226 (anhydride modified polyethylene, available from Dow), BYNEL™ 41E710 (coextrudable adhesive resin, available from Dow), SURLYN™ 1650 (ionomer resin, available from Dow), FUSABOND™ P353 (a chemically modified polypropylene copolymer, available from Dow), ELVALOY™ PTW (ethylene terpolymer, available from Dow), ELVALOY™ 3427AC (a copolymer of ethylene and butyl acrylate, available from Dow), LOTADER™ AX8840 (ethylene acrylate-based terpolymer, available from Arkema), LOTADER™ 3210 (ethylene acrylate-based terpolymer, available from Arkema), LOTADER™ 3410 (ethylene acrylate-based terpolymer, available from Arkema), LOTADER™ 3430 (ethylene acrylate-based terpolymer, available from Arkema), LOTADER™ 4700 (ethylene acrylate-based terpolymer, available from Arkema), LOTADER™ AX8900 (ethylene acrylate-based terpolymer, available from Arkema), LOTADER™ 4720 (ethylene acrylate-based terpolymer, available from Arkema), BAXXODUR™ EC 301 (amine for epoxy, available from BASF), BAXXODUR™ EC 311 (amine for epoxy, available from BASF), BAXXODUR™ EC 303 (amine for epoxy, available from BASF), BAXXODUR™ EC 280 (amine for epoxy, available from BASF), BAXXODUR™ EC 201 (amine for epoxy, available from BASF), BAXXODUR™ EC 130 (amine for epoxy, available from BASF), BAXXODUR™ EC 110 (amine for epoxy, available from BASF), styrenics, polypropylene, polyamides, polycarbonate, EASTMAN™ G-3003 (a maleic anhydride grafted polypropylene, available from Eastman), RETAIN™ (polymer modifier available from Dow), AMPLIFY TY™ (maleic anhydride grafted polymer, available from Dow), INTUNE™ (olefin block copolymer, available from Dow), and the like and any combination thereof.

The polyamide 102 and the other thermoplastic polymer (if included) may cumulatively be present in the mixture 110 at about 5 wt % to about 60 wt % (or about 5 wt % to about 25 wt %, or about 10 wt % to about 30 wt %, or about 20 wt % to about 45 wt %, or about 25 wt % to about 50 wt %, or about 40 wt % to about 60 wt %) of the polyamide 102, the other thermoplastic polymer (if included), and carrier fluid 104 combined. The other thermoplastic polymer (if included) may be present at about 0.1 wt % to about 40 wt % (or about 0.1 wt % to about 10 wt %, or about 1 wt % to about 25 wt %, or about 10 wt % to about 40 wt %) of the polyamide 102 and the other thermoplastic polymer combined.

Suitable carrier fluids 104 have a viscosity at 25° C. of about 1,000 cSt to about 150,000 cSt (or about 1,000 cSt to about 60,000 cSt, or about 40,000 cSt to about 100,000 cSt, or about 75,000 cSt to about 150,000 cSt).

Examples of carrier fluids 104 include, but are not limited to, silicone oil, fluorinated silicone oils, perfluorinated silicone oils, polyethylene glycols, alkyl-terminal polyethylene glycols (e.g., C1-C4 terminal alkyl groups like tetraethylene glycol dimethyl ether (TDG)), paraffins, liquid petroleum jelly, vison oils, turtle oils, soya bean oils, perhydrosqualene, sweet almond oils, calophyllum oils, palm oils, parleam oils, grapeseed oils, sesame oils, maize oils, rapeseed oils, sunflower oils, cottonseed oils, apricot oils, castor oils, avocado oils, jojoba oils, olive oils, cereal germ oils, esters of lanolic acid, esters of oleic acid, esters of lauric acid, esters of stearic acid, fatty esters, higher fatty acids, fatty alcohols, polysiloxanes modified with fatty acids, polysiloxanes modified with fatty alcohols, polysiloxanes modified with polyoxy alkylenes, and the like, and any combination thereof. Examples of silicone oils include, but are not limited to, polydimethylsiloxane, methylphenylpolysiloxane, an alkyl modified polydimethylsiloxane, an alkyl modified methylphenylpolysiloxane, an amino modified polydimethylsiloxane, an amino modified methylphenlpolysiloxane, a fluorine modified polydimethylsiloxane, a fluorine modified methylphenylpolysiloxane, a polyether modified polydimethylsiloxane, a polyether modified methylphenylpolysiloxane, and the like, and any combination thereof. The carrier fluid 104 may have one or more phases. For example, polysiloxanes modified with fatty acids and polysiloxanes modified with fatty alcohols (preferably with similar chain lengths for the fatty acids and fatty alcohols) may form a single-phase carrier fluid 104. In another example, a carrier fluid 104 comprising a silicone oil and an alkyl-terminal polyethylene glycol may form a two-phase carrier fluid 104.

The carrier fluid 104 may be present in the mixture 110 at about 40 wt % to about 95 wt % (or about 75 wt % to about 95 wt %, or about 70 wt % to about 90 wt %, or about 55 wt % to about 80 wt %, or about 50 wt % to about 75 wt %, or about 40 wt % to about 60 wt %) of the polyamide 102 and carrier fluid 104 combined.

In some instances, the carrier fluid 104 may have a density of about 0.6 g/cm$^3$ to about 1.5 g/cm$^3$, and the polyamide 102 has a density of about 0.7 g/cm$^3$ to about 1.7 g/cm$^3$, wherein the polyamide has a density greater than the density of the carrier fluid.

The emulsion stabilizers used in the methods and compositions of the present disclosure may comprise nanoparticles (e.g., oxide nanoparticles, carbon black, polymer nanoparticles, and combinations thereof), surfactants, and the like, and any combination thereof.

Oxide nanoparticles may be metal oxide nanoparticles, non-metal oxide nanoparticles, or mixtures thereof. Examples of oxide nanoparticles include, but are not limited to, silica, titania, zirconia, alumina, iron oxide, copper oxide, tin oxide, boron oxide, cerium oxide, thallium oxide, tungsten oxide, and the like, and any combination thereof. Mixed metal oxides and/or non-metal oxides, like aluminosilicates, borosilicates, and aluminoborosilicates, are also inclusive in the term metal oxide. The oxide nanoparticles may by hydrophilic or hydrophobic, which may be native to the particle or a result of surface treatment of the particle. For example, a silica nanoparticle having a hydrophobic surface treatment, like dimethyl silyl, trimethyl silyl, and the like, may be used in methods and compositions of the present disclosure. Additionally, silica with functional surface treatments like methacrylate functionalities may be used in methods and compositions of the present disclosure. Unfunctionalized oxide nanoparticles may also be suitable for use as well.

Commercially available examples of silica nanoparticles include, but are not limited to, AEROSIL® particles available from Evonik (e.g., AEROSIL® R812S (about 7 nm average diameter silica nanoparticles having a hydrophobically modified surface and a BET surface area of 260±30 m$^2$/g), AEROSIL® RX50 (about 40 nm average diameter silica nanoparticles having a hydrophobically modified surface and a BET surface area of 35±10 m$^2$/g), AEROSIL® 380 (silica nanoparticles having a hydrophilically modified surface and a BET surface area of 380±30 m$^2$/g), and the like, and any combination thereof.

Carbon black is another type of nanoparticle that may be present as an emulsion stabilizer in the compositions and methods disclosed herein. Various grades of carbon black will be familiar to one having ordinary skill in the art, any of which may be used herein. Other nanoparticles capable of absorbing infrared radiation may be used similarly.

Polymer nanoparticles are another type of nanoparticle that may be present as an emulsion stabilizer in the disclosure herein. Suitable polymer nanoparticles may include one or more polymers that are thermosetting and/or crosslinked, such that they do not melt when processed by melt emulsification according to the disclosure herein. High molecular weight thermoplastic polymers having high melting or decomposition points may similarly comprise suitable polymer nanoparticle emulsion stabilizers.

The nanoparticles may have an average diameter (D50 based on volume) of about 1 nm to about 500 nm (or about 10 nm to about 150 nm, or about 25 nm to about 100 nm, or about 100 nm to about 250 nm, or about 250 nm to about 500 nm).

The nanoparticles may have a BET surface area of about 10 $m^2/g$ to about 500 $m^2/g$ (or about 10 $m^2/g$ to about 150 $m^2/g$, or about 25 $m^2/g$ to about 100 $m^2/g$, or about 100 $m^2/g$ to about 250 $m^2/g$, or about 250 $m^2/g$ to about 500 $m^2/g$).

Nanoparticles may be included in the mixture 110 at a concentration of about 0.01 wt % to about 10 wt % (or about 0.01 wt % to about 1 wt %, or about 0.1 wt % to about 3 wt %, or about 1 wt % to about 5 wt %, or about 5 wt % to about 10 wt %) based on the weight of the polyamide polymer 102.

Surfactants may be anionic, cationic, nonionic, or zwitterionic. Examples of surfactants include, but are not limited to, sodium dodecyl sulfate, sorbitan oleates, poly[dimethylsiloxane-co-[3-(2-(2-hydroxyethoxy)ethoxy)propylmethylsiloxane], docusate sodium (sodium 1,4-bis(2-ethylhexoxy)-1,4-dioxobutane-2-sulfonate), and the like, and any combination thereof. Commercially available examples of surfactants include, but are not limited to, CALFAX® DB-45 (sodium dodecyl diphenyl oxide disulfonate, available from Pilot Chemicals), SPAN® 80 (sorbitan maleate non-ionic surfactant), MERPOL® surfactants (available from Stepan Company), TERGITOL™ TMN-6 (a water-soluble, nonionic surfactant, available from DOW), TRITON™ X-100 (octyl phenol ethoxylate, available from SigmaAldrich), IGEPAL® CA-520 (polyoxyethylene (5) isooctylphenyl ether, available from SigmaAldrich), BRIJ® S10 (polyethylene glycol octadecyl ether, available from SigmaAldrich), and the like, and any combination thereof.

Surfactants may be included in the mixture 110 at a concentration of about 0.01 wt % to about 10 wt % (or about 0.01 wt % to about 1 wt %, or about 0.5 wt % to about 2 wt %, or about 1 wt % to about 3 wt %, or about 2 wt % to about 5 wt %, or about 5 wt % to about 10 wt %) based on the weight of the polyamide 102. Alternatively, the mixture 110 may comprise no (or be absent of) surfactant.

A weight ratio of nanoparticles to surfactant may be about 1:10 to about 10:1 (or about 1:10 to about 1:1, or about 1:5 to about 5:1, or about 1:1 to about 10:1).

As described above, the components 102, 104, and 106 can be added in any order and include mixing and/or heating during the process of combining 108 the components 102, 104, and 106. For example, the emulsion stabilizer 106 may first be dispersed in the carrier fluid 104, optionally with heating said dispersion, before adding the polyamide polymer 102. In another nonlimiting example, the polyamide polymer 102 may be heated to produce a polymer melt to which the carrier fluid 104 and emulsion stabilizer 106 are added together or in either order. In yet another nonlimiting example, the polyamide polymer 102 and carrier fluid 104 can be mixed at an a temperature greater than the melting point or softening temperature of the polyamide polymer 102 and at a shear rate sufficient enough to disperse the polyamide polymer melt in the carrier fluid 104. Then, the emulsion stabilizer 106 can be added to form the mixture 110 and maintained at suitable process conditions for a set period of time.

Combining 108 the components 102, 104, and 106 in any combination can occur in a mixing apparatus used for the processing 112 and/or another suitable vessel. By way of nonlimiting example, the polyamide polymer 102 may be heated to a temperature greater than the melting point or softening temperature of the polyamide polymer 102 in the mixing apparatus used for the processing 112, and the emulsion stabilizer 106 may be dispersed in the carrier fluid 104 in another vessel. Then, said dispersion may be added to the melt of the polyamide polymer 102 in the mixing apparatus used for the processing 112.

The mixing apparatuses used for the processing 112 to produce the melt emulsion 114 should be capable of maintaining the melt emulsion 114 at a temperature greater than the melting point or softening temperature of the polyamide polymer 102 and applying a shear rate sufficient to disperse the polymer melt in the carrier fluid 104 as droplets.

Examples of mixing apparatuses used for the processing 112 to produce the melt emulsion 114 include, but are not limited to, stirred reactors, blenders, reactors with inline homogenizer systems, and the like, and apparatuses derived therefrom.

Processing 112 and forming the melt emulsion 114 at suitable process conditions (e.g., temperature, shear rate, and the like) for a set period of time.

The temperature of processing 112 and forming the melt emulsion 114 should be a temperature greater than the melting point or softening temperature of the polyamide polymer 102 and less than the decomposition temperature of any components 102, 104, and 106 in the mixture 110. For example, the temperature of processing 112 and forming the melt emulsion 114 may be about 1° C. to about 50° C. (or about 1° C. to about 25° C., or about 5° C. to about 30° C., or about 20° C. to about 50° C.) greater than the melting point or softening temperature of the polyamide polymer 102 provided the temperature of processing 112 and forming the melt emulsion 114 is less than the decomposition temperature of any components 102, 104, and 106 in the mixture 110.

The shear rate of processing 112 and forming the melt emulsion 114 should be sufficiently high to disperse the polymer melt in the carrier fluid 104 as droplets. Said droplets should comprise droplets having a diameter of about 1000 μm or less (or about 1 μm to about 1000 μm, or about 1 μm to about 50 μm, or about 10 μm to about 100 μm, or about 10 μm to about 250 μm, or about 50 μm to about 500 μm, or about 250 μm to about 750 μm, or about 500 μm to about 1000 μm).

The time for maintaining said temperature and shear rate for processing 112 and forming the melt emulsion 114 may be 10 seconds to 18 hours or longer (or 10 seconds to 30 minutes, or 5 minutes to 1 hour, or 15 minutes to 2 hours, or 1 hour to 6 hours, or 3 hours to 18 hours). Without being limited by theory, it is believed that a steady state of droplet sizes will be reached at which point processing 112 can be stopped. That time may depend on, among other things, the temperature, shear rate, polyamide polymer 102 composition, the carrier fluid 104 composition, and the emulsion stabilizer 106 composition.

The melt emulsion 114 may then be cooled 116. Cooling 116 can be slow (e.g., allowing the melt emulsion to cool under ambient conditions) to fast (e.g., quenching). For example, the rate of cooling may range from about 10° C./hour to about 100° C./second to almost instantaneous with quenching (for example in dry ice) (or about 10° C./hour to about 60° C./hour, or about 0.5° C./minute to about 20° C./minute, or about 1° C./minute to about 5° C./minute, or about 10° C./minute to about 60° C./minute, or about 0.5° C./second to about 10° C./second, or about 10° C./second to about 100° C./second).

During cooling, little to no shear may be applied to the melt emulsion 114. In some instances, the shear applied during heating may be applied during cooling.

The cooled mixture 118 resulting from cooling 116 the melt emulsion 114 comprises solidified polyamide polymer particles 122 (or simply polyamide polymer particles) and other components 124 (e.g., the carrier fluid 104, excess emulsion stabilizer 106, and the like). The polyamide polymer particles may be dispersed in the carrier fluid or settled in the carrier fluid.

The cooled mixture 118 may then be treated 120 to the separate polyamide polymer particles 122 (or simply polyamide polymer particles 122) from the other components 124. Suitable treatments include, but are not limited to, washing, filtering, centrifuging, decanting, and the like, and any combination thereof.

Solvents used for washing the polyamide polymer particles 122 should generally be (a) miscible with the carrier fluid 104 and (b) nonreactive (e.g., non-swelling and non-dissolving) with the polyamide polymer 102. The choice of solvent will depend on, among other things, the composition of the carrier fluid and the composition of the polyamide polymer 102.

Examples of solvents include, but are not limited to, hydrocarbon solvents (e.g., pentane, hexane, heptane, octane, cyclohexane, cyclopentane, decane, dodecane, tridecane, and tetradecane), aromatic hydrocarbon solvents (e.g., benzene, toluene, xylene, 2-methyl naphthalene, and cresol), ether solvents (e.g., diethyl ether, tetrahydrofuran, diisopropyl ether, and dioxane), ketone solvents (e.g., acetone and methyl ethyl ketone), alcohol solvents (e.g., methanol, ethanol, isopropanol, and n-propanol), ester solvents (e.g., ethyl acetate, methyl acetate, butyl acetate, butyl propionate, and butyl butyrate), halogenated solvents (e.g., chloroform, bromoform, 1,2-dichloromethane, 1,2-dichloroethane, carbon tetrachloride, chlorobenzene, and hexafluoroisopropanol), water, and the like, and any combination thereof.

Solvent may be removed from the polyamide polymer particles 122 by drying using an appropriate method such as air-drying, heat-drying, reduced pressure drying, freeze drying, or a hybrid thereof. The heating may be performed preferably at a temperature lower than the glass transition point of the polyamide polymer (e.g., about 50° C. to about 150° C.).

The polyamide polymer particles 122 after separation from the other components 124 may optionally be further classified to produce purified polyamide polymer particles 128. For example, to narrow the particle size distribution (or reduce the diameter span), the polyamide polymer particles 122 can be passed through a sieve having a pore size of about 10 μm to about 250 μm (or about 10 μm to about 100 μm, or about 50 μm to about 200 μm, or about 150 μm to about 250 μm).

In another example purification technique, the polyamide polymer particles 122 may be washed with water to remove surfactant while maintaining substantially all of the nanoparticles associated with the surface of the polyamide polymer particles 122. In yet another example purification technique, the polyamide polymer particles 122 may be blended with additives to achieve a desired final product. For clarity, because such additives are blended with the polyamide particles 122 or other particles resultant from the methods described herein after the particles are solidified, such additives are referred to herein as "external additives." Examples of external additives include flow aids, other polymer particles, fillers, and the like, and any combination thereof.

In some instances, a surfactant used in making the polyamide polymer particles 122 may be unwanted in downstream applications. Accordingly, yet another example purification technique may include at least substantial removal of the surfactant from the polyamide polymer particles 122 (e.g., by washing and/or pyrolysis).

The polyamide polymer particles 122 and/or purified polyamide polymer particles 128 (referred to as particles 122/128) may be characterized by composition, physical structure, and the like.

As described above, the emulsion stabilizers are at the interface between the polymer melt and the carrier fluid. As a result, when the mixture is cooled, the emulsion stabilizers remain at, or in the vicinity of, said interface. Therefore, the structure of the particles 122/128 is, in general, includes emulsion stabilizers (a) dispersed on an outer surface of the particles 122/128 and/or (b) embedded in an outer portion (e.g., outer 1 vol %) of the particles 122/128.

Further, where voids form inside the polymer melt droplets, emulsion stabilizers 106 should generally be at (and/or embedded in) the interface between the interior of the void and the polyamide polymer. The voids generally do not contain the polyamide polymer. Rather, the voids may contain, for example, carrier fluid, air, or be void. The particles 122/128 may comprise carrier fluid at about 5 wt % or less (or about 0.001 wt % to about 5 wt %, or about 0.001 wt % to about 0.1 wt %, or about 0.01 wt % to about 0.5 wt %, or about 0.1 wt % to about 2 wt %, or about 1 wt % to about 5 wt %) of the particles 122/128.

The polyamide polymer 102 may be present in the particles 122/128 at about 90 wt % to about 99.5 wt % (or about 90 wt % to about 95 wt %, or about 92 wt % to about 97 wt %, or about 95 wt % to about 99.5 wt %) of the particles 122/128.

The emulsion stabilizers 106 may be present in the particles 122/128 at about 10 wt % or less (or about 0.01 wt % to about 10 wt %, or about 0.01 wt % to about 1 wt %, or about 0.5 wt % to about 5 wt %, or about 3 wt % to about 7 wt %, or about 5 wt % to about 10 wt %) of the particles 122/128. When purified to at least substantially remove surfactant or another emulsion stabilizer, the emulsion stabilizers 106 may be present in the particles 128 at less than 0.01 wt % (or 0 wt % to about 0.01 wt %, or 0 wt % to 0.001 wt %).

Upon forming polyamide particulates according to the disclosure herein, at least a portion of the nanoparticles, such as silica nanoparticles, may be disposed as a coating upon the outer surface of the polyamide particulates. At least a portion of the surfactant, if used, may be associated with the outer surface as well. The coating may be disposed substantially uniformly upon the outer surface. As used herein with respect to a coating, the term "substantially uniform" refers to even coating thickness in surface locations covered by the coating composition (e.g., nanoparticles and/or surfactant), particularly the entirety of the outer surface. The emulsion stabilizers 106 may form a coating that covers at least 5% (or about 5% to about 100%, or about 5% to about 25%, or about 20% to about 50%, or about 40% to about 70%, or about 50% to about 80%, or about 60% to about 90%, or about 70% to about 100%) of the surface area of the particles 122/128. When purified to at least substantially remove surfactant or another emulsion stabilizer, the emulsion stabilizers 106 may be present in the particles 128 at less than 25% (or 0% to about 25%, or about 0.1% to about 5%, or about 0.1% to about 1%, or about 1% to about 5%, or about 1% to about 10%, or about 5% to about 15%, or about 10% to about 25%) of the surface area of the particles 128. The coverage of the emulsion stabilizers 106 on an outer surface of the particles 122/128 may be determined using image analysis of the SEM micrographs. The emulsion stabilizers 106 may form a coating that covers at least 5% (or about 5% to about 100%, or about 5% to about 25%, or about 20% to about 50%, or about 40% to about 70%, or about 50% to about 80%, or about 60% to about 90%, or about 70% to about 100%) of the surface area of the particles 122/128. When purified to at least substantially remove surfactant or another emulsion stabilizer, the emulsion stabilizers 106 may be present in the particles 128 at less than 25% (or 0% to about 25%, or about 0.10% to about 5%, or about 0.10% to about 1%, or about 1% to about 5%, or about 1% to about 10%, or about 5% to about 15%, or about 10% to about 25%) of the surface area of the particles 128. The coverage of the emulsion stabilizers 106 on an outer surface of the particles 122/128 may be determined using image analysis of the SEM micrographs The particles 122/128 may have a D10 of about 0.1 µm to about 125 µm (or about 0.1 µm to about 5 µm, about 1 µm to about 10 µm, about 5 µm to about 30 µm, or about 1 µm to about 25 µm, or about 25 µm to about 75 µm, or about 50 µm to about 85 µm, or about 75 µm to about 125 µm), a D50 of about 0.5 µm to about 200 µm (or about 0.5 µm to about 10 µm, or about 5 µm to about 50 µm, or about 30 µm to about 100 µm, or about 30 µm to about 70 µm, or about 25 µm to about 50 µm, or about 50 µm to about 100 µm, or about 75 µm to about 150 µm, or about 100 µm to about 200 µm), and a D90 of about 3 µm to about 300 µm (or about 3 µm to about 15 µm, or about 10 µm to about 50 µm, or about 25 µm to about 75 µm, or about 70 µm to about 200 µm, or about 60 µm to about 150 µm, or about 150 µm to about 300 µm), wherein D10<D50<D90. The particles 122/128 may also have a diameter span of about 0.2 to about 10 (or about 0.2 to about 0.5, or about 0.4 to about 0.8, or about 0.5 to about 1.0, or about 1 to about 3, or about 2 to about 5, or about 5 to about 10). Without limitation, diameter span values of 1.0 or greater are considered broad, and diameter spans values of 0.75 or less are considered narrow. Without limitation, diameter span values of 1.0 or greater are considered broad, and diameter spans values of 0.75 or less are considered narrow.

In a first nonlimiting example, the particles 122/128 may have a D10 of about 0.1 µm to about 10 µm, a D50 of about 0.5 µm to about 25 µm, and a D90 of about 3 µm to about 50 µm, wherein D10<D50<D90. Said particles 122/128 may have a diameter span of about 0.2 to about 2.

In a second nonlimiting example, the particles 122/128 may have a D10 of about 5 µm to about 30 µm, a D50 of about 30 µm to about 70 µm, and a D90 of about 70 µm to about 120 µm, wherein D10<D50<D90. Said particles 122/128 may have a diameter span of about 1.0 to about 2.5.

In a third nonlimiting example, the particles 122/128 may have a D10 of about 25 µm to about 60 µm, a D50 of about 60 µm to about 110 µm, and a D90 of about 110 µm to about 175 µm, wherein D10<D50<D90. Said particles 122/128 may have a diameter span of about 0.6 to about 1.5.

In a fourth nonlimiting example, the particles 122/128 may have a D10 of about 75 µm to about 125 µm, a D50 of about 100 µm to about 200 µm, and a D90 of about 125 µm to about 300 µm, wherein D10<D50<D90. Said particles 122/128 may have a diameter span of about 0.2 to about 1.2.

In a fifth nonlimiting example, the particles 122/128 may have a D10 of about 1 µm to about 50 µm (or about 5 µm to about 30 µm, or about 1 µm to about 25 µm, or about 25 µm to about 50 µm), a D50 of about 25 µm to about 100 µm (or about 30 µm to about 100 µm, or about 30 µm to about 70 µm, or about 25 µm to about 50 µm, or about 50 µm to about 100 µm), and a D90 of about 60 µm to about 300 µm (or about 70 µm to about 200 µm, or about 60 µm to about 150 µm, or about 150 µm to about 300 µm), wherein D10<D50<D90. The particles 122/128 may also have a diameter span of about 0.4 to about 3 (or about 0.6 to about 2, or about 0.4 to about 1.5, or about 1 to about 3).

The particles 122/128 may have a circularity of about 0.9 or greater (or about 0.90 to about 1.0, or about 0.93 to about 0.99, or about 0.95 to about 0.99, or about 0.97 to about 0.99, or about 0.98 to about 1.0).

The particles 122/128 may have an angle of repose of about 20° to about 45° (or about 25° to about 35°, or about 30° to about 40°, or about 35° to about 45°).

The particles 122/128 may have a Hausner ratio of about 1.0 to about 1.5 (or about 1.0 to about 1.2, or about 1.1 to about 1.3, or about 1.2 to about 1.35, or about 1.3 to about 1.5).

The particles 122/128 may have a bulk density of about 0.3 g/cm$^3$ to about 0.8 g/cm$^3$ (or about 0.3 g/cm$^3$ to about 0.6 g/cm$^3$, or about 0.4 g/cm$^3$ to about 0.7 g/cm$^3$, or about 0.5 g/cm$^3$ to about 0.6 g/cm$^3$, or about 0.5 g/cm$^3$ to about 0.8 g/cm$^3$).

Depending on the temperature and shear rate of processing 112 and the composition and relative concentrations of the components 102, 104, and 106, different shapes of the structures that compose the particles 122/128 have been observed. Typically, the particles 122/128 comprise substantially spherical particles (having a circularity of about 0.97 or greater). However, other structures included disc and elongated structures have been observed in the particles 122/128. Therefore, the particles 122/128 may comprise one or more of: (a) substantially spherical particles having a circularity of 0.97 or greater, (b) disc structures having an aspect ratio of about 2 to about 10, and (c) elongated structures having an aspect ratio of 10 or greater. Each of the (a), (b), and (c) structures have emulsion stabilizers dispersed on an outer surface of the (a), (b), and (c) structures and/or embedded in an outer portion of the (a), (b), and (c) structures. At least some of the (a), (b), and (c) structures may be agglomerated. For example, the (c) elongated structures may be laying on the surface of the (a) substantially spherical particles.

The particles 122/128 may have a sintering window that is within 10° C., preferably within 5° C., of the sintering window of the thermoplastic polymer 102 (comprising one or more polyamides and optionally one or more other thermoplastic polymers).

Applications of Polyamide Particles

The polyamide particles described herein may be utilized in 3-D print processes, particularly those employing selective laser sintering to promote particulate consolidation. The polyamide particles of the present disclosure may exhibit advantageous properties over polymer particulates having irregular shapes or wider particulate distributions, such as those available commercially. In nonlimiting examples, the polyamide particles of the present disclosure may undergo consolidation at lower laser powers and afford a decreased extent of void formation in an object produced by 3-D printing.

3-D printing processes of the present disclosure may comprise: depositing polyamide particles of the present disclosure upon a surface in a specified shape, and once deposited, heating at least a portion of the polyamide particles to promote consolidation thereof and form a consolidated body (object), such that the consolidated body has a void percentage of about 1% or less after being consolidated. For example, heating and consolidation of the polyamide particles may take place in a 3-D printing apparatus employing a laser, such that heating and consolidation take place by selective laser sintering.

Any of the polyamide particles disclosed herein may be formulated in a composition suitable for 3-D printing. Choice of the composition and type of polyamide particulate may be based upon various factors such as, but not limited to, the laser power used for selective laser sinter, the type of object being produced, and the intended use conditions for the object.

Examples of objects that may be 3-D printed using the polyamide particles of the present disclosure include, but are not limited to, containers (e.g., for food, beverages, cosmetics, personal care compositions, medicine, and the like), shoe soles, toys, furniture parts and decorative home goods, plastic gears, screws, nuts, bolts, cable ties, automotive parts, medical items, prosthetics, orthopedic implants, aerospace/aircraft-related parts, production of artifacts that aid learning in education, 3D anatomy models to aid in surgeries, robotics, biomedical devices (orthotics), home appliances, dentistry, electronics, sporting goods, and the like.

Other applications for the polyamide particulates of the present disclosure may include, but are not limited to, use as a filler in paints and powder coatings, inkjet materials and electrophotographic toners, and the like.

Nonlimiting Example Embodiments

A first nonlimiting embodiment of the present disclosure is a method comprising: mixing a mixture comprising a polyamide, a carrier fluid that is immiscible with the polyamide, and nanoparticles (e.g., comprising oxide nanoparticles, carbon black, and/or polymer nanoparticles) at a temperature greater than a melting point or softening temperature of the polyamide and at a shear rate sufficiently high to disperse the polyamide in the carrier fluid; cooling the mixture to below the melting point or softening temperature of the polyamide to form solidified particles comprising polyamide particles having a circularity of 0.90 or greater and that comprise the polyamide and the nanoparticles associated with an outer surface of the polyamide particles; and separating the solidified particles from the carrier fluid. The first nonlimiting embodiment may further include one or more of: Element 1: wherein at least some of the nanoparticles are embedded in the outer surface of the polyamide particles; Element 2: wherein at least some of the polyamide particles have a void comprising the nanoparticles at a void/polyamide interface; Element 3: Element 2 and wherein the nanoparticles are embedded in a surface of the void/polyamide interface; Element 4: Element 2 and wherein the void contains the carrier fluid; Element 5: wherein the solidified particles further comprise elongated structures that comprise the polyamide with the nanoparticles associated with an outer surface of the elongated structures; Element 6: wherein the nanoparticles form a coating that covers less than 5% of the surface of the polyamide particles; Element 7: wherein the nanoparticles form a coating that covers at least 5% of the surface of the polyamide particle; Element 8: wherein the nanoparticles form a coating that covers at least 25% of the surface of the polyamide particles; Element 9: wherein the nanoparticles form a coating that covers at least 50% of the surface of the polyamide particles; Element 10: wherein the polyamide is present in the mixture at 5 wt % to 60 wt % of the mixture; Element 11: wherein the nanoparticles are present in the mixture at 0.01 wt % to 10 wt % by weight of the polyamide; Element 12: wherein the nanoparticles have an average diameter of 1 nm to 500 nm; Element 13: wherein the polyamide is selected from the group consisting of an aliphatic polyamide, a polyphthalamide, an aramid, and any combination thereof; Element 14: wherein the polyamide is selected from the group consisting of: polycaproamide, poly(hexamethylene succinamide), polyhexamethylene adipamide, polypentamethylene adipamide, polyhexamethylene sebacamide, polyundecamide, polydodecamide, and polyhexamethylene terephthalamide, nylon 10,10, nylon 10,12, nylon 10,14, nylon 10,18, nylon 6,18, nylon 6,12, nylon 6,14, nylon 12,12, a semi-aromatic polyamide, an aromatic polyamide, polyesteramide, polyetheresteramide, polycarbonate-esteramide, polyether-block-amide elastomers, any copolymer thereof, and any combination thereof; Element 15: wherein the melting point or softening temperature of the polyamide is 50° C. to 450° C.; Element 16: wherein the carrier fluid is selected from the group consisting of: silicone oil, fluorinated silicone oils, perfluorinated silicone oils, polyethylene glycols, alkyl-terminal polyethylene glycols, paraffins, liquid petroleum jelly, vison oils, turtle oils, soya bean oils, perhydrosqualene, sweet almond oils, calophyllum oils, palm oils, parleam oils, grapeseed oils, sesame oils, maize oils, rapeseed oils, sunflower oils, cottonseed oils, apricot oils, castor oils, avocado oils, jojoba oils, olive oils, cereal germ oils, esters of lanolic acid, esters of oleic acid, esters of lauric acid, esters of stearic acid, fatty esters, higher fatty acids, fatty alcohols, polysiloxanes modified with fatty acids, polysiloxanes modified with fatty alcohols, polysiloxanes modified with polyoxy alkylenes, and any combination thereof; Element 17: Element 16 and wherein the silicone oil is selected from the group consisting of: polydimethylsiloxane, methylphenylpolysiloxane, an alkyl modified polydimethylsiloxane, an alkyl modified methylphenylpolysiloxane, an amino modified polydimethylsiloxane, an amino modified methylphenylpolysiloxane, a fluorine modified polydimethylsiloxane, a fluorine modified methylphenylpolysiloxane, a polyether modified polydimethylsiloxane, a polyether modified methylphenylpolysiloxane, and any combination thereof; Element 18: wherein the carrier fluid has a viscosity at 25° C. of 1,000 cSt to 150,000 cSt; Element 19: wherein the carrier fluid has a density of 0.6 g/cm$^3$ to 1.5 g/cm$^3$, wherein the polyamide has a density of 0.7 g/cm$^3$ to 1.7 g/cm$^3$; Element 20: wherein mixing occurs in a stirred reactor; Element 21: wherein the mixture further comprises a surfactant; Element 22: wherein the solidified particles have a D10 of about 0.5 μm to about 125 μm, a D50 of about 1 μm to about 200 μm, and a D90 of about 70 μm to about 300 μm, wherein D10<D50<D90; Element 23: wherein the solidified particles have a diameter span of about 0.2 to about 10; Element 24: wherein the solidified particles have a D10 of about 5 μm to about 30 μm, a D50 of about 30 μm to about 70 μm, and a D90 of about 70 μm to about 120 μm, wherein D10<D50<D90; Element 25: Element 24 and wherein the solidified particles have a diameter span of about 1.0 to about 2.5; Element 26: wherein the solidified particles have a D10 of about 25 μm to about 60 μm, a D50 of about 60 μm to about 110 μm, and a D90 of about 110 μm to about 175 μm, wherein D10<D50<D90; Element 27: Element 26 and wherein the solidified particles have a diameter span of about 0.6 to about 1.5; Element 28: wherein the solidified particles have a D10 of about 75 μm to about 125 μm, a D50 of about 100 μm to about 200 μm, and a D90 of about 125 μm to about 300 μm, wherein D10<D50<D90; Element 29: Element 28 and wherein the solidified particles have a diameter span of about 0.2 to about 1.2; Element 30: wherein the solidified particles have a circularity of about 0.97 to about 1.0; and Element 31: wherein the solidified particles have a Hausner ratio of about 1.0 to about 1.35. Examples of combinations include, but are not limited to, Element 1 in combination with one or more of Elements 2-31; Element 2 in combination with one or more of Elements 3-31; Element 10 in combination with one or more of Elements 3-9 and 11-31; and one or more of Elements 1-12 in combination with one or more of Elements 13-31.

A second nonlimiting example of the present disclosure is a composition comprising: particles comprising polyamide particles having a circularity of 0.90 or greater and that comprise a polyamide and nanoparticles associated with an outer surface of the polyamide particles. The second nonlimiting embodiment may further include one or more of: Element 1; Element 2; Element 3; Element 4; Element 5; Element 6; Element 7; Element 8; Element 9; Element 10; Element 11; Element 12; Element 13; Element 14; Element 15; Element 22; Element 23; Element 24; Element 25; Element 26; Element 27; Element 28; Element 29; Element 30; Element 31; and Element 32: wherein the polyamide is present at 90 wt % to 99.5 wt % of the particles. Elements 2 may also be in combination with one or more of Elements 16-19. Any of the combinations of element from the first nonlimiting embodiment and Element 32 with any of the foregoing elements may be included in the second nonlimiting embodiment.

Clauses

Clause 1. A method comprising: mixing a mixture comprising a polyamide, a carrier fluid that is immiscible with the polyamide, and nanoparticles at a temperature greater than a melting point or softening temperature of the polyamide and at a shear rate sufficiently high to disperse the polyamide in the carrier fluid; cooling the mixture to below the melting point or softening temperature of the polyamide to form solidified particles comprising polyamide particles having a circularity of 0.90 or greater and that comprise the polyamide and the nanoparticles associated with an outer surface of the polyamide particles; and separating the solidified particles from the carrier fluid.

Clause 2. The method of Clause 1, wherein at least some of the nanoparticles are embedded in the outer surface of the polyamide particles.

Clause 3. The method of Clause 1, wherein at least some of the polyamide particles have a void comprising the nanoparticles at a void/polyamide interface.

Clause 4. The method of Clause 3, wherein the nanoparticles are embedded in a surface of the void/polyamide interface.

Clause 5. The method of Clause 3, wherein the void contains the carrier fluid.

Clause 6. The composition of Clause 1, wherein the solidified particles further comprise elongated structures that comprise the polyamide with the nanoparticles associated with an outer surface of the elongated structures.

Clause 7. The composition of Clause 1, wherein the nanoparticles form a coating that covers less than 5% of the surface of the polyamide particles.

Clause 8. The composition of Clause 1, wherein the nanoparticles form a coating that covers at least 5% of the surface of the polyamide particles.

Clause 9. The composition of Clause 1, wherein the nanoparticles form a coating that covers at least 25% of the surface of the polyamide particles.

Clause 10. The composition of Clause 1, wherein the nanoparticles form a coating that covers at least 50% of the surface of the polyamide particles.

Clause 11. The method of Clause 1, wherein the polyamide is present in the mixture at 5 wt % to 60 wt % of the mixture.

Clause 12. The method of Clause 1, wherein the nanoparticles are present in the mixture at 0.01 wt % to 10 wt % by weight of the polyamide.

Clause 13. The method of claim Clause 1, wherein the nanoparticles have an average diameter of 1 nm to 500 nm.

Clause 14. The method of Clause 1, wherein the polyamide is selected from the group consisting of: an aliphatic polyamide, a polyphthalamide, an aramid, and any combination thereof.

Clause 15. The method of Clause 1, wherein the polyamide is selected from the group consisting of: polycaproamide, poly(hexamethylene succinamide), polyhexamethylene adipamide, polypentamethylene adipamide, polyhexamethylene sebacamide, polyundecamide, polydodecamide, and polyhexamethylene terephthalamide, nylon 10,10, nylon 10,12, nylon 10,14, nylon 10,18, nylon 6,18, nylon 6,12, nylon 6,14, nylon 12,12, a semi-aromatic polyamide, an aromatic polyamide, polyesteramide, polyetheresteramide, polycarbonate-esteramide, polyether-block-amide elastomers, any copolymer thereof, and any combination thereof.

Clause 16. The method of Clause 1, wherein the melting point or softening temperature of the polyamide is 50° C. to 450° C.

Clause 17. The method of Clause 1, wherein the carrier fluid is selected from the group consisting of: silicone oil, fluorinated silicone oils, perfluorinated silicone oils, polyethylene glycols, alkyl-terminal polyethylene glycols, paraffins, liquid petroleum jelly, vison oils, turtle oils, soya bean oils, perhydrosqualene, sweet almond oils, calophyllum oils, palm oils, parleam oils, grapeseed oils, sesame oils, maize oils, rapeseed oils, sunflower oils, cottonseed oils, apricot oils, castor oils, avocado oils, jojoba oils, olive oils, cereal germ oils, esters of lanolic acid, esters of oleic acid, esters of lauric acid, esters of stearic acid, fatty esters, higher fatty acids, fatty alcohols, polysiloxanes modified with fatty acids, polysiloxanes modified with fatty alcohols, polysiloxanes modified with polyoxy alkylenes, and any combination thereof.

Clause 18. The method of Clause 17, wherein the silicone oil is selected from the group consisting of: polydimethylsiloxane, methylphenylpolysiloxane, an alkyl modified polydimethylsiloxane, an alkyl modified methylphenylpolysiloxane, an amino modified polydimethylsiloxane, an amino modified methylphenylpolysiloxane, a fluorine modified polydimethylsiloxane, a fluorine modified methylphenylpolysiloxane, a polyether modified polydimethylsiloxane, a polyether modified methylphenylpolysiloxane, and any combination thereof.

Clause 19. The method of Clause 1, wherein the carrier fluid has a viscosity at 25° C. of 1,000 cSt to 150,000 cSt.

Clause 20. The method of Clause 1, wherein the carrier fluid has a density of 0.6 g/cm$^3$ to 1.5 g/cm$^3$, wherein the polyamide has a density of 0.7 g/cm$^3$ to 1.7 g/cm$^3$.

Clause 21. The method of Clause 1, wherein mixing occurs in a stirred reactor.

Clause 22. The method of Clause 1, wherein the mixture further comprises a surfactant.

Clause 23. The method of Clause 1, wherein the solidified particles have a D10 of about 0.5 µm to about 125 µm, a D50 of about 1 µm to about 200 µm, and a D90 of about 70 µm to about 300 µm, wherein D10<D50<D90.

Clause 24. The method of Clause 1, wherein the solidified particles have a diameter span of about 0.2 to about 10.

Clause 25. The method of Clause 1, wherein the solidified particles have a D10 of about 5 µm to about 30 µm, a D50 of about 30 µm to about 70 µm, and a D90 of about 70 µm to about 120 µm, wherein D10<D50<D90.

Clause 26. The method of Clause 25, wherein the solidified particles have a diameter span of about 1.0 to about 2.5.

Clause 27. The method of Clause 1, wherein the solidified particles have a D10 of about 25 μm to about 60 μm, a D50 of about 60 μm to about 110 μm, and a D90 of about 110 μm to about 175 μm, wherein D10<D50<D90.

Clause The method of Clause 27, wherein the solidified particles have a diameter span of about 0.6 to about 1.5.

Clause 29. The method of Clause 1, wherein the solidified particles have a D10 of about 75 μm to about 125 μm, a D50 of about 100 μm to about 200 μm, and a D90 of about 125 μm to about 300 μm, wherein D10<D50<D90.

Clause 30. The method of Clause 29, wherein the solidified particles have a diameter span of about 0.2 to about 1.2.

Clause 31. The method of Clause 1, wherein the solidified particles have a circularity of about 0.97 to about 1.0.

Clause 32. The method of Clause 1, wherein the solidified particles have a Hausner ratio of about 1.0 to about 1.35.

Clause 33. The method of Clause 1, wherein the nanoparticles comprise oxide nanoparticles.

Clause 34. The method of Clause 1, wherein the nanoparticles comprise carbon black.

Clause 35. The method of Clause 1, wherein the nanoparticles comprise polymer nanoparticles.

Clause 36. The method of Clause 1, wherein mixture further comprises a thermoplastic polymer that is not the polyamide.

Clause 37. The method of Clause 36, wherein the thermoplastic polymer is a thermoplastic elastomer.

Clause 38. A composition comprising: particles comprising polyamide particles having a circularity of 0.90 or greater and that comprise a polyamide and nanoparticles associated with an outer surface of the polyamide particles.

Clause 39. The composition of Clause 38, wherein at least some of the nanoparticles are embedded in the outer surface of the particles.

Clause 40. The composition of Clause 38, wherein the polyamide is present at 90 wt % to 99.5 wt % of the particles.

Clause 41. The composition of Clause 38, wherein at least some of the particles have a void comprising the nanoparticles at a void/polyamide interface.

Clause 42. The composition of Clause 41, wherein the nanoparticles are embedded in the void/polyamide interface.

Clause 43. The composition of Clause 41, wherein the void contains a carrier fluid having a viscosity at 25° C. of 1,000 cSt to 150,000 cSt.

Clause 44. The composition of Clause 38, wherein the particles further comprise elongated structures that comprise the polyamide with the nanoparticles associated with an outer surface of the elongated structures.

Clause 45. The composition of Clause 38, wherein the nanoparticles form a coating that covers less than 5% of the surface of the particles.

Clause 46. The composition of Clause 38, wherein the nanoparticles form a coating that covers at least 5% of the surface of the particles.

Clause 47. The composition of Clause 38, wherein the nanoparticles form a coating that covers at least 25% of the surface of the particles.

Clause 48. The composition of Clause 38, wherein the nanoparticles form a coating that covers at least 50% of the surface of the particles.

Clause 49. The composition of Clause 38, wherein the nanoparticles have an average diameter of 1 nm to 500 nm.

Clause 50. The composition of Clause 38, wherein the polyamide is selected from the group consisting of: an aliphatic polyamide, a polyphthalamide, an aramid, and any combination thereof.

Clause 51. The composition of Clause 38, wherein the polyamide is selected from the group consisting of: polycaproamide, poly(hexamethylene succinamide), polyhexamethylene adipamide, polypentamethylene adipamide, polyhexamethylene sebacamide, polyundecamide, polydodecamide, and polyhexamethylene terephthalamide, nylon 10,10, nylon 10,12, nylon 10,14, nylon 10,18, nylon 6,18, nylon 6,12, nylon 6,14, nylon 12,12, a semi-aromatic polyamide, an aromatic polyamide, polyesteramide, polyetheresteramide, polycarbonate-esteramide, polyether-block-amide elastomers, any copolymer thereof, and any combination thereof.

Clause 52. The composition of Clause 38, wherein the melting point or softening temperature of the polyamide is 50° C. to 450° C.

Clause 53. The composition of Clause 38, wherein the particles have a D10 of about 0.5 μm to about 125 μm, a D50 of about 1 μm to about 200 μm, and a D90 of about 70 μm to about 300 μm, wherein D10<D50<D90.

Clause 54. The composition of Clause 53, wherein the particles have a diameter span of about 0.2 to about 10.

Clause 55. The composition of Clause 38, wherein the particles have a D10 of about 5 μm to about 30 μm, a D50 of about 30 μm to about 70 μm, and a D90 of about 70 μm to about 120 μm, wherein D10<D50<D90.

Clause 56. The composition of Clause 55, wherein the particles have a diameter span of about 1.0 to about 2.5.

Clause 57. The composition of Clause 38, wherein the particles have a D10 of about 25 μm to about 60 μm, a D50 of about 60 μm to about 110 μm, and a D90 of about 110 μm to about 175 μm, wherein D10<D50<D90.

Clause 58. The composition of Clause 57, wherein the particles have a diameter span of about 0.6 to about 1.5.

Clause 59. The composition of Clause 38, wherein the particles have a D10 of about 75 μm to about 125 μm, a D50 of about 100 μm to about 200 μm, and a D90 of about 125 μm to about 300 μm, wherein D10<D50<D90.

Clause 60. The composition of Clause 59, wherein the solidified particles have a diameter span of about 0.2 to about 1.2.

Clause 61. The composition of Clause 38, wherein the particles have a circularity of about 0.90 to about 1.0.

Clause 62. The composition of Clause 38, wherein the particles have a Hausner ratio of about 1.0 to about 1.5.

Clause 63. The composition of Clause 38, wherein the nanoparticles comprise oxide nanoparticles.

Clause 64. The composition of Clause 38, wherein the nanoparticles comprise carbon black.

Clause 65. The composition of Clause 38, wherein the nanoparticles comprise polymer nanoparticles.

Clause 66. The composition of Clause 38, wherein polyamide particles further comprises a thermoplastic polymer that is not the polyamide.

Clause 67. The composition of Clause 66, wherein the thermoplastic polymer is a thermoplastic elastomer.

Unless otherwise indicated, all numbers expressing quantities of ingredients, properties such as molecular weight, process conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

Examples

Figure 2:
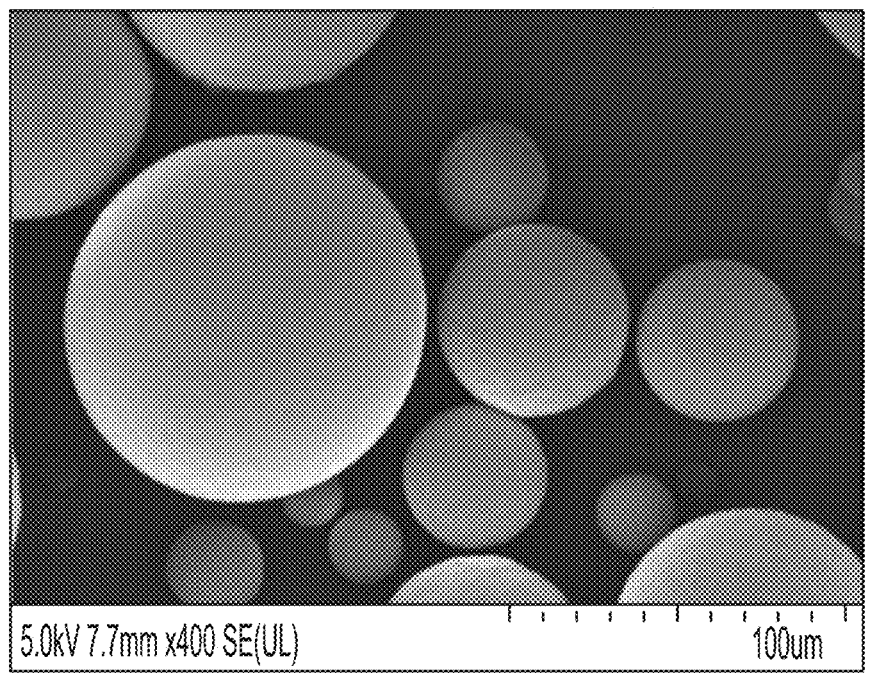
FIG. 2 is a scanning electron micrograph of polyamide particles.

Example 1. A 1 L stirred reactor from Parr Instruments was used to prepare polyamide 6 particles by melt emulsification. The reactor was loaded with 20 wt % polyamide 6 and 80 wt % 10,000 cSt PDMS oil. The mixture was then heated to 225° C. while stirring at 1000 rpm using a dual 4-blade propeller. After about 60 minutes, the mixture was discharged from the reactor onto dry ice to quench the mixture. The mixture was then filtered and washed to recover the polymer particles. The resultant polymer particles were passed through a 150-μm sieve. Approximately, 40 wt % of the polyamide 6 loaded into the reactor passed through the 150-μm sieve. FIG. 2 is an SEM micrograph of the particles after sieving, which illustrates the range of particle sizes as large.

Example 2. A 2 L glass reactor from Buchi AG was used to prepare polyamide 12 particles by melt emulsification. The reactor was loaded with 1 wt % AEROSIL® R812S silica nanoparticles (by weight of the polyamide 12 in the final mixture) in 10,000 cSt PDMS oil. The mixture was heated to 200° C. before adding 23 wt % polyamide 12 pellets relative to the combined weight of the PDMS oil and polyamide 12. The reactor was mixed at 500 rpm for 30 minutes. The resultant mixture was discharged and cooled to ambient temperate at a rate of about 1° C. to about 3° C. per minute. The mixture was then washed with heptane and filtered through a 90 mm WHATMAN® #1 paper filter to recover the polymer particles. The resultant polymer particles were air dried overnight in a fume hood. The dried particles have a D50 of about 227 μm, and the dried particles passed through a 150-μm sieve have a D50 of about 124 μm.

Example 3. Polyamide 12 particles (Samples 3-1 to 3-44) were prepared by melt emulsification in a 1 L glass kettle reactor. 10,000 cSt PDMS oil, 23% polyamide 12 (from RTP, EMX-Grivory, or from Arkema) relative to the combined weight of the PDMS oil and polyamide 12, and a desired amount of silica nanoparticles (AEROSIL® R812S or AEROSIL® RX50) by weight of polyamide 12 were added to the glass kettle. The order of addition was either (c) PDMS oil and silica nanoparticles mixed to a good dispersion then polyamide added or (d) PDMS oil, polyamide, and silica nanoparticles added before mixing. The nitrogen headspace purge was then turned on, and the mixture heated to a desired temperature (e.g., 200° C., 210° C., or 220° C.) over 90 minutes at 260 rpm. Once at temperature, the rotor speed was increased to a desired rpm. Samples were taken at various times. Once complete, heating and stirring were turned off, and the reactor was allowed to cool to room temperature before discharging the mixture. The resultant mixture was filtered and washed with heptane. The resultant particles were allowed to air dry overnight in a fume hood. Optionally, the dried particles were screened (scr) through a 150-μm sieve. Table 1 lists the experimental details and resultant particle properties.

For Samples 3-45 to 3-47, a 2 L stainless reactor from Buchi AG was used to prepare polyamide 12 particles by melt emulsification. The reactor was loaded with 0.67 wt % AEROSIL® R812S silica nanoparticles (by weight of the polyamide 12 in the final mixture) in 60,000 cSt PDMS oil and was sealed without N2 purge. The mixture was heated to 250° C. at ramping rate of 3.68° C./min before adding 30 wt % polyamide 12 pellets relative to the combined weight of the PDMS oil and polyamide 12. When the reactor temperature reached 245° C., slowly opened vent valve and purged reactor with N2 at flow rate of 2-3 scfh. The reactor was mixed at 650 rpm for 60 minutes. The resultant mixture was cooled down with gentle stirring at 50 rpm to less than 60° C. and discharged. The process samples taken 40 min, 60 min and final room temp. were then washed with heptane and filtered through a 90 mm WHATMAN® #1 paper filter to recover the polymer particles. The resultant polymer particles were air dried overnight in a fume hood. The dried particles have a D50 of about 21.3 μm, and the final dried particles passed through a 150-μm sieve have a D50 of about 21.5 μm.

For Samples 3-48 to 3-50, a 2 L stainless reactor from Buchi AG was used to prepare polyamide 12 particles by melt emulsification. The reactor was loaded with 0.67 wt % AEROSIL® R812S silica nanoparticles (by weight of the polyamide 12 in the final mixture) in 60,000 cSt PDMS oil and was purged with N2 at flow rate of 2-3 scfh. The mixture was heated to 250° C. at ramping rate of 3.68° C./min before adding 30 wt % polyamide 12 pellets relative to the combined weight of the PDMS oil and polyamide 12. The reactor was mixed at 650 rpm for 60 minutes. The resultant mixture was cooled down with gentle stirring at 50 rpm to less than 60° C. and discharged. The process samples taken 50 min, 60 min time point and at room temp. were then washed with heptane and filtered through a 90 mm WHATMAN® #1 paper filter to recover the polymer particles. The final room temp. sample was aggregated and the particle size was not measured. The resultant polymer particles taken at 60 min were air dried overnight in a fume hood. The dried particles have a D50 of about 25.8 μm, and the dried particles passed through a 150-μm sieve have a D50 of about 26.4 μm.

For Samples 3-51 to 3-53, a 2 L stainless reactor from Buchi AG was used to prepare polyamide 12 particles by melt emulsification. The reactor was loaded with 0.67 wt % AEROSIL® R812S silica nanoparticles (by weight of the polyamide 12 in the final mixture) in 60,000 cSt PDMS oil and was purged with N2 at 2-3 flow rate of scfh. The mixture was heated to 250° C. at ramping rate of 5.68° C./min before adding 30 wt % polyamide 12 pellets relative to the combined weight of the PDMS oil and polyamide 12. The reactor was mixed at 650 rpm for 60 minutes. The resultant mixture was cooled down with gentle stirring at 50 rpm to less than 60° C. and discharged. The process samples taken at 60 min time point and at room temp. were then washed with heptane and filtered through a 90 mm WHATMAN® #1 paper filter to recover the polymer particles. The final room temp. sample was aggregated and the particle size was not measured. The resultant polymer particles taken at 60 min were air dried overnight in a fume hood. The dried particles have a D50 of about 33.8 μm, and the dried particles passed through a 150-μm sieve have a D50 of about 34.9 μm.

TABLE 1

| Sample | Set Temp (° C.) | RPM | Time (min) | Order of Add. | PA-12 | Silica (wt % and type) | Screened Particle Size (μm or unitless) D10 | D50 | D90 | Span | Not Screened Particle Size (μm or unitless) D10 | D50 | D90 | Span | Yield (wt %) Not Scr | Scr |
|---|---|---|---|---|---|---|---|---|---|---|---|---|---|---|---|---|
| 3-1 | 220 | 600 | 10 | (c) | EMS-Griv. | 1% R812S | 46.5 | 87.1 | 146 | 1.14 | | | | | 77.5 | 72.7 |
| 3-2 | | | 26 | | | | 57.2 | 90.6 | 137 | 0.89 | | | | | 83.8 | 68.8 |
| 3-3 | | | 30 | | | | 48.4 | 78.7 | 124 | 0.96 | | | | | 92.0 | 67.7 |
| 3-4 | | | 50 | | | | 53.4 | 84.7 | 128 | 0.89 | | | | | 93.9 | 57.6 |
| 3-5 | 220 | 600 | 15 | (c) | EMS-Griv. | 1% R812S | 34.9 | 76.3 | 131 | 1.99 | | | | | 90.8 | 74.3 |
| 3-6 | 220 | 1250 | 10 | (c) | EMS-Griv. | 1% R812S | 16.2 | 43.8 | 103 | 1.98 | | | | | 92.7 | 71.4 |
| 3-7 | | | 20 | | | | 19.3 | 44 | 95.5 | 1.73 | | | | | 94.3 | 69.6 |
| 3-8 | | | 30 | | | | 20 | 44.4 | 97.2 | 1.74 | | | | | 96.4 | 71.9 |
| 3-9 | | | 40 | | | | 21 | 43.8 | 92.7 | 1.64 | | | | | 87.2 | 80 |
| 3-10 | | | RT | | | | 21.1 | 44.4 | 91.7 | 1.59 | | | | | 99.2 | 72.1 |
| 3-11 | 220 | 1250 | 40 | (c) | EMS-Griv. | 1% R812S | 16.7 | 49.5 | 108 | 1.85 | | | | | 95.7 | 82.1 |
| 3-12 | | | 100 | | | | 21.5 | 50.9 | 106 | 1.65 | | | | | 94.9 | 84.6 |
| 3-13 | | | 160 | | | | 23.1 | 51.4 | 106 | 1.61 | | | | | 92.6 | 89.3 |
| 3-14 | | | 220 | | | | 21.9 | 49.8 | 104 | 1.64 | | | | | 92.6 | 90.6 |
| 3-15 | | | RT | | | | 22.9 | 52 | 108 | 1.64 | | | | | 94.3 | 91.1 |
| 3-16 | 220 | 1250 | 15 | (c) | RTP | 1% R812S | 12 | 46 | 104 | 1.41 | | | | | | |
| 3-17 | 220 | 1250 | 40 | (d) | RTP | 0.33% R812S | 46.7 | 8.35 | 139 | 1.02 | | | | | 97.3 | 77.4 |
| 3-18 | | | 90 | | | | 53.1 | 89.5 | 144 | 1.02 | | | | | 95.4 | 78.7 |
| 3-19 | 210 | 1250 | 15 | (d) | RTP | 0.33% R812S | 44.2 | 70.7 | 112 | 0.96 | | | | | 94.7 | 80.8 |
| 3-20 | | | 40 | | | | 46.1 | 71.7 | 111 | 0.90 | | | | | 92.6 | 8.6 |
| 3-21 | | | 90 | | | | 49.8 | 78.9 | 124 | 0.94 | | | | | 88.7 | 90.6 |
| 3-22 | | | RT | | | | 50.2 | 78.9 | 123 | 0.93 | | | | | 93.5 | 88.3 |
| 3-23 | 200 | 1250 | 15 | (d) | RTP | 0.33% R812S | 56.6 | 84.4 | 125 | 0.81 | 49.7 | 85.5 | 169 | 1.40 | 93.3 | 89.2 |
| 3-24 | | | 40 | | | | 58 | 84.8 | 124 | 0.77 | 52.4 | 86.2 | 154 | 1.18 | 91.5 | 95.5 |
| 3-25 | | | 90 | | | | 61.1 | 86.7 | 123 | 0.71 | 55.3 | 84.9 | 142 | 1.05 | 92.1 | 89.7 |
| 3-26 | | | RT | | | | 59.4 | 84.6 | 121 | 0.73 | 54 | 89.4 | 166 | 1.25 | 93.3 | 91.8 |
| 3-27 | 220 | 1250 | 15 | (d) | RTP | 1% R812S | 16.2 | 43.9 | 95 | 1.79 | 17.8 | 54.8 | 300 | 5.15 | 96.0 | 83.3 |
| 3-28 | | | 40 | | | | 19.8 | 46.3 | 96.7 | 1.66 | 19.7 | 53.3 | 263 | 4.57 | 95.4 | 97.9 |
| 3-29 | | | 90 | | | | 21.1 | 47.7 | 106 | 1.79 | 21 | 49 | 220 | 4.05 | 96.4 | 84.8 |
| 3-30 | | | RT | | | | 20.5 | 45.1 | 96.9 | 1.69 | 20.8 | 49.7 | 210 | 3.85 | 96.7 | 91.5 |
| 3-31 | 220 | 1250 | 15 | (d) | RTP | 1% RX50 | 37.2 | 66.1 | 116 | 1.17 | 35.4 | 71.2 | 252 | 3.04 | 98.2 | 85.5 |
| 3-32 | | | 40 | | | | 37.6 | 67.7 | 118 | 1.87 | | | | | 93.8 | 84.8 |
| 3-33 | | | 90 | | | | 39.4 | 67.4 | 115 | 1.12 | 36.7 | 72.1 | 239 | 2.81 | 95.2 | 84.8 |
| 3-34 | | | RT | | | | 36.4 | 65 | 113 | 1.18 | 36 | 73.2 | 254 | 2.98 | 96.1 | 88.5 |
| 3-35 | 220 | 1250 | 15 | (d) | RTP | 0.33% RX50 | 101 | 125 | 135 | 0.94 | 101 | 125 | 135 | 0.43 | 94.7 | 29.7 |
| 3-35 | | | 40 | | | | 99.5 | 128 | 164 | 0.51 | 108 | 172 | 271 | 0.95 | 94.7 | 25.5 |
| 3-36 | | | 90 | | | | 102 | 129 | 162 | 0.46 | 116 | 175 | 265 | 0.85 | 94.7 | 21.2 |
| 3-37 | | | RT | | | | 98.7 | 121 | 151 | 0.43 | 113 | 170 | 255 | 0.83 | 84.2 | 15.2 |
| 3-38 | 220 | 1250 | 40 | (d) | EMS-Griv. | 0.33% R812S | 56.6 | 79.9 | 112 | 0.688 | 51.4 | 87.6 | 216 | 1.884 | 90.2 | 81.8 |
| 3-39 | | | 90 | | | | 60.7 | 87.1 | 124 | 0.729 | 56.5 | 95.5 | 218 | 1.688 | 90.5 | 77.6 |
| 3-40 | | | RT | | | | 66.7 | 93.8 | 132 | 0.702 | 60.9 | 100 | 196 | 1.35 | 92.1 | 80.1 |
| 3-41 | 220 | 1250 | 15 | (d) | Ark. | 1% R812S | | | | | | | | | | |
| 3-42 | | | 40 | | | | 52.4 | 79.4 | 121 | 0.864 | 50 | 83.8 | 159 | 1.302 | 93.4 | 89.4 |
| 3-43 | | | 90 | | | | 55.5 | 82.6 | 122 | 0.81 | 49.3 | 80 | 138 | 1.103 | 92.4 | 83.2 |
| 3-44 | | | RT | | | | | | | | | | | | | |
| 3-45 | 250 | 650 | 40 | | RTP | 0.67% R812S | 14.5 | 20.3 | 28.5 | 0.69 | 14.1 | 20.1 | 28.5 | 0.72 | 98.42 | 96.6 |
| 3-46 | | | 60 | | | | 12.6 | 20.0 | 31.1 | 0.93 | 12.1 | 19.8 | 32.4 | 1.02 | 96.97 | 94.2 |
| 3-47 | | | RT | | | | 15.4 | 21.5 | 29.8 | 0.67 | 15.1 | 21.3 | 29.8 | 0.69 | 97.48 | 96.9 |
| 3-48 | 250 | 250 | 50 | | RTP | 0.67% R812S | 14.9 | 25.3 | 40.5 | 1.01 | 13.4 | 24.8 | 41.6 | 1.14 | 97.45 | 96.0 |
| 3-49 | | | 60 | | | | 14.3 | 26.4 | 45.0 | 1.17 | 13.4 | 25.8 | 46.4 | 1.28 | 98.05 | 93.6 |
| 3-50 | | | RT | | | | | | | | | | | | | |
| 3-51 | 250 | 650 | 40 | | RTP | 0.67% R812S | | | | | | | | | | |
| 3-52 | | | 60 | | | | 19.2 | 34.9 | 59.1 | 1.15 | 17.8 | 33.8 | 58.7 | 1.21 | 97.86 | 91.3 |
| 3-53 | | | RT | | | | | | | | | | | | | |

"RT" refers to once the mixture has cooled to reach room temperature.
Blank cells indicated values not measured.

Figure 3:
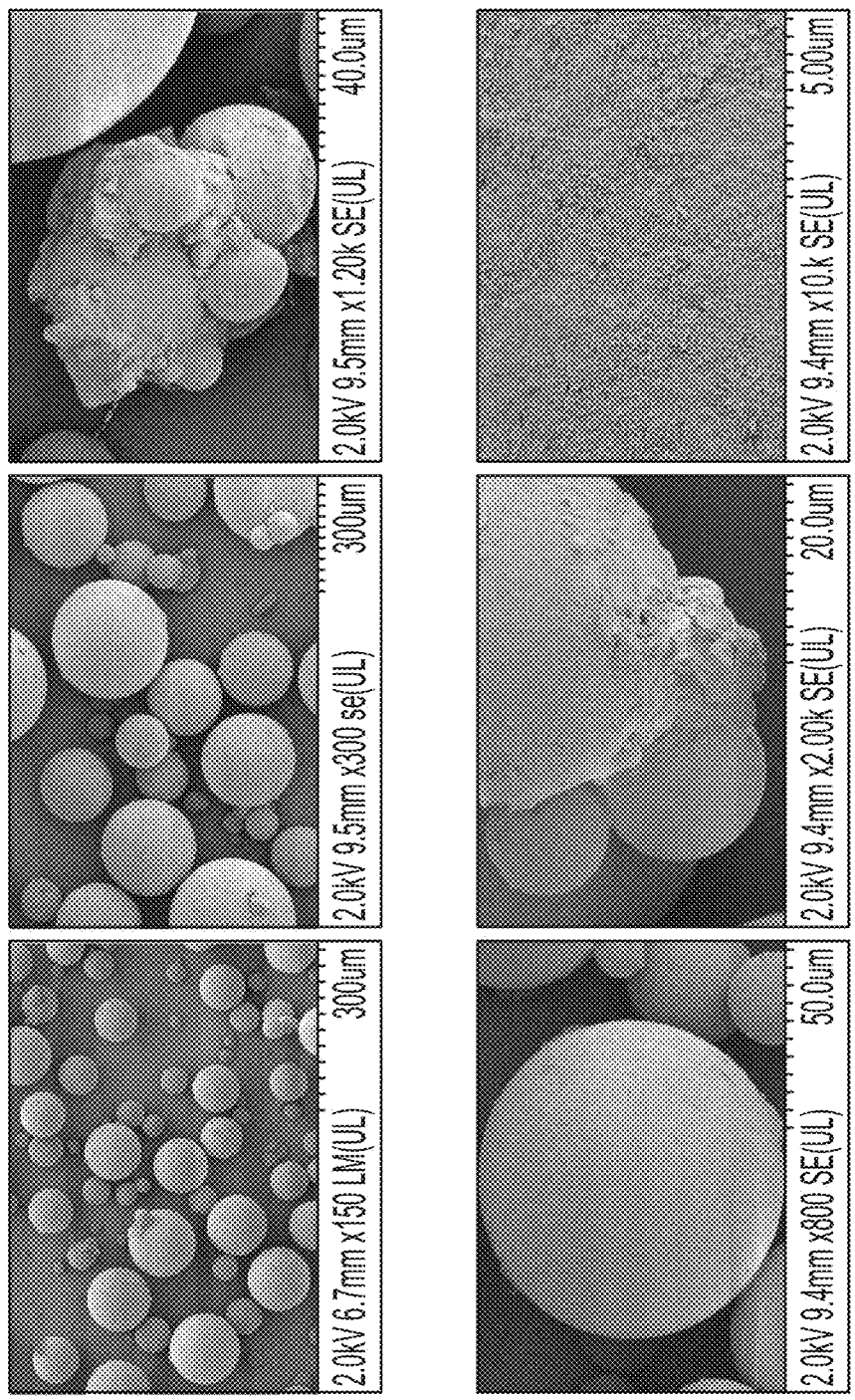
FIG. 3 includes scanning electron micrographs of polyamide particles.
Figure 4:
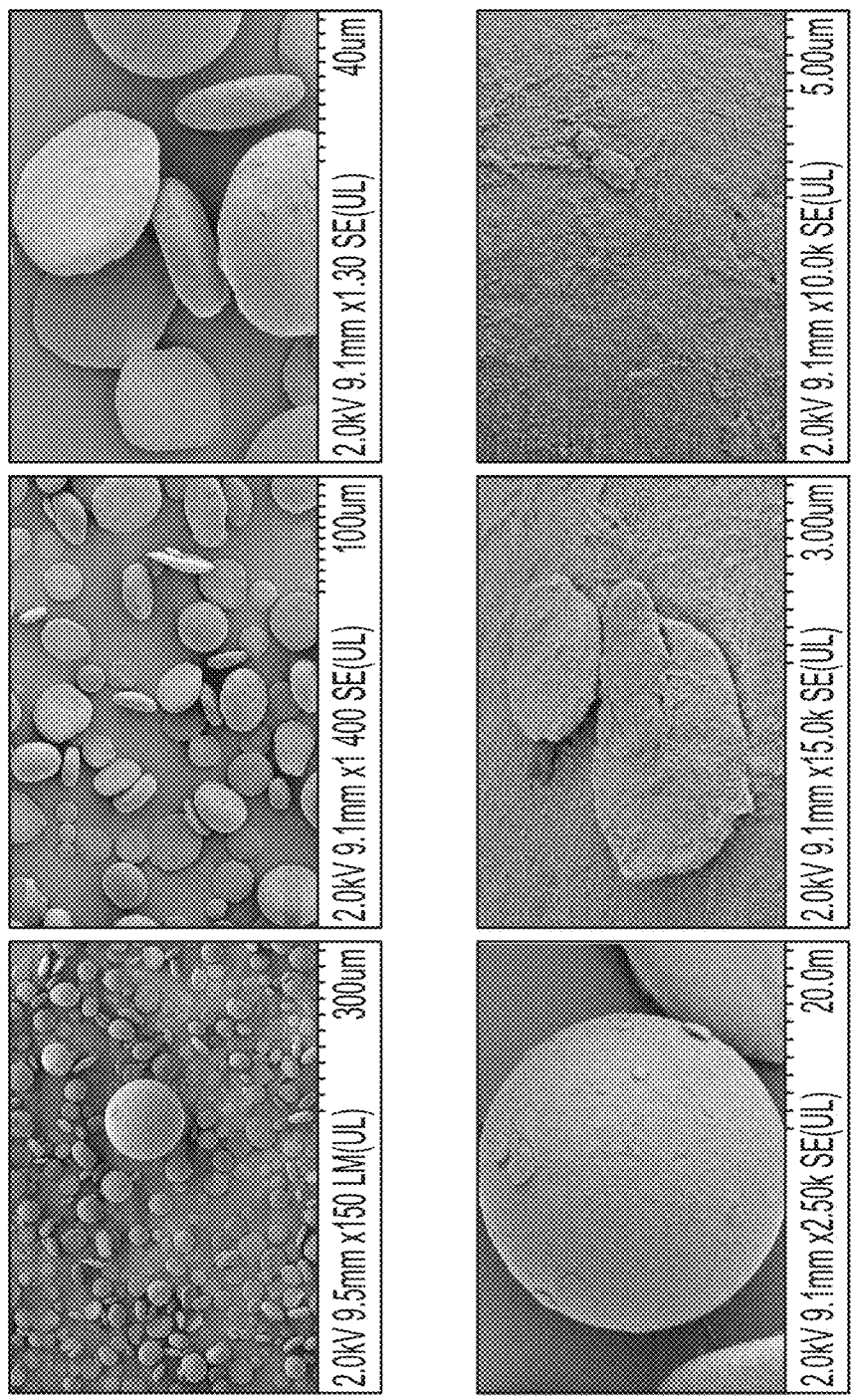
FIG. 4 includes scanning electron micrographs of polyamide particles.
Figure 5:
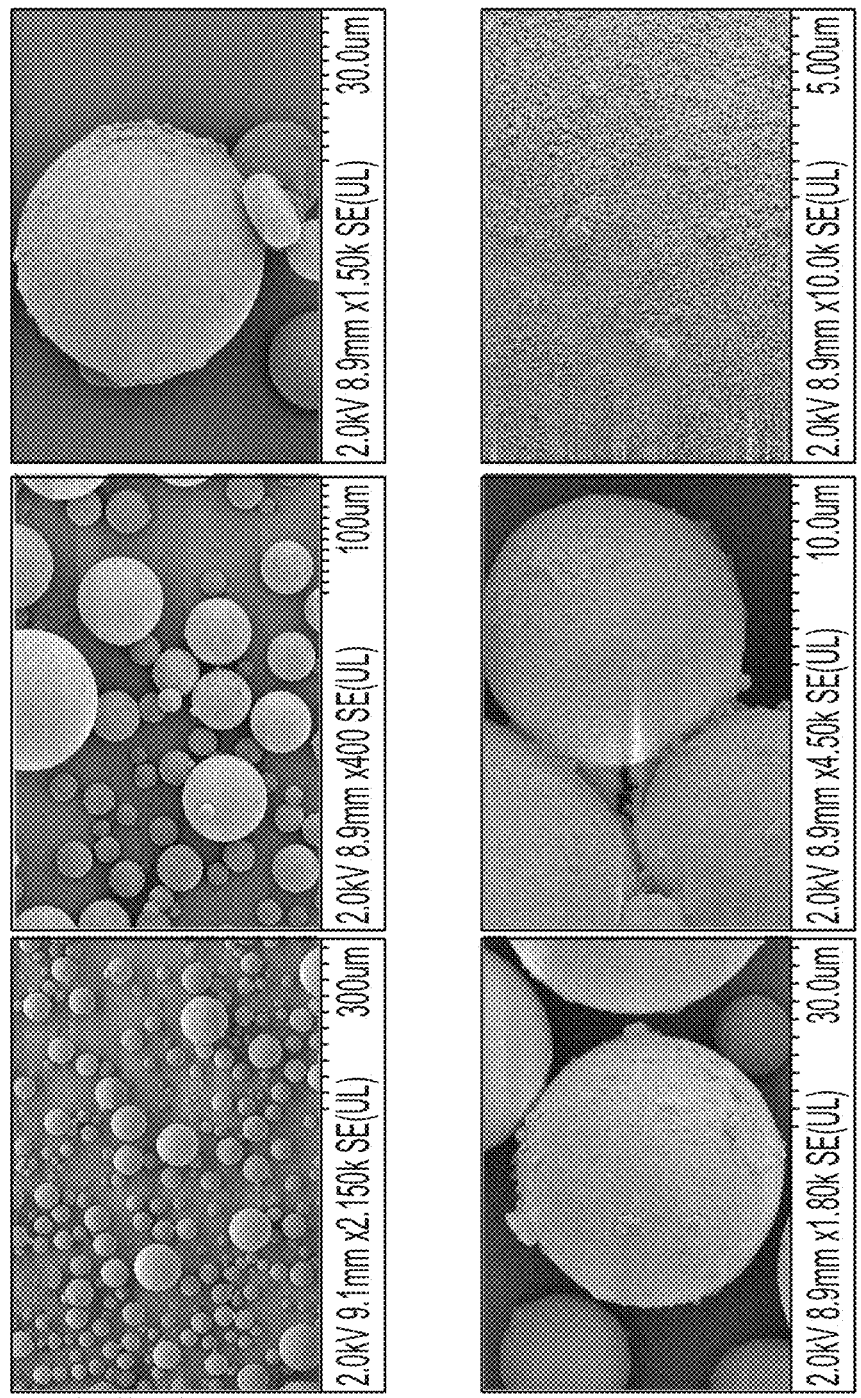
FIG. 5 includes scanning electron micrographs of polyamide particles.
Figure 6:
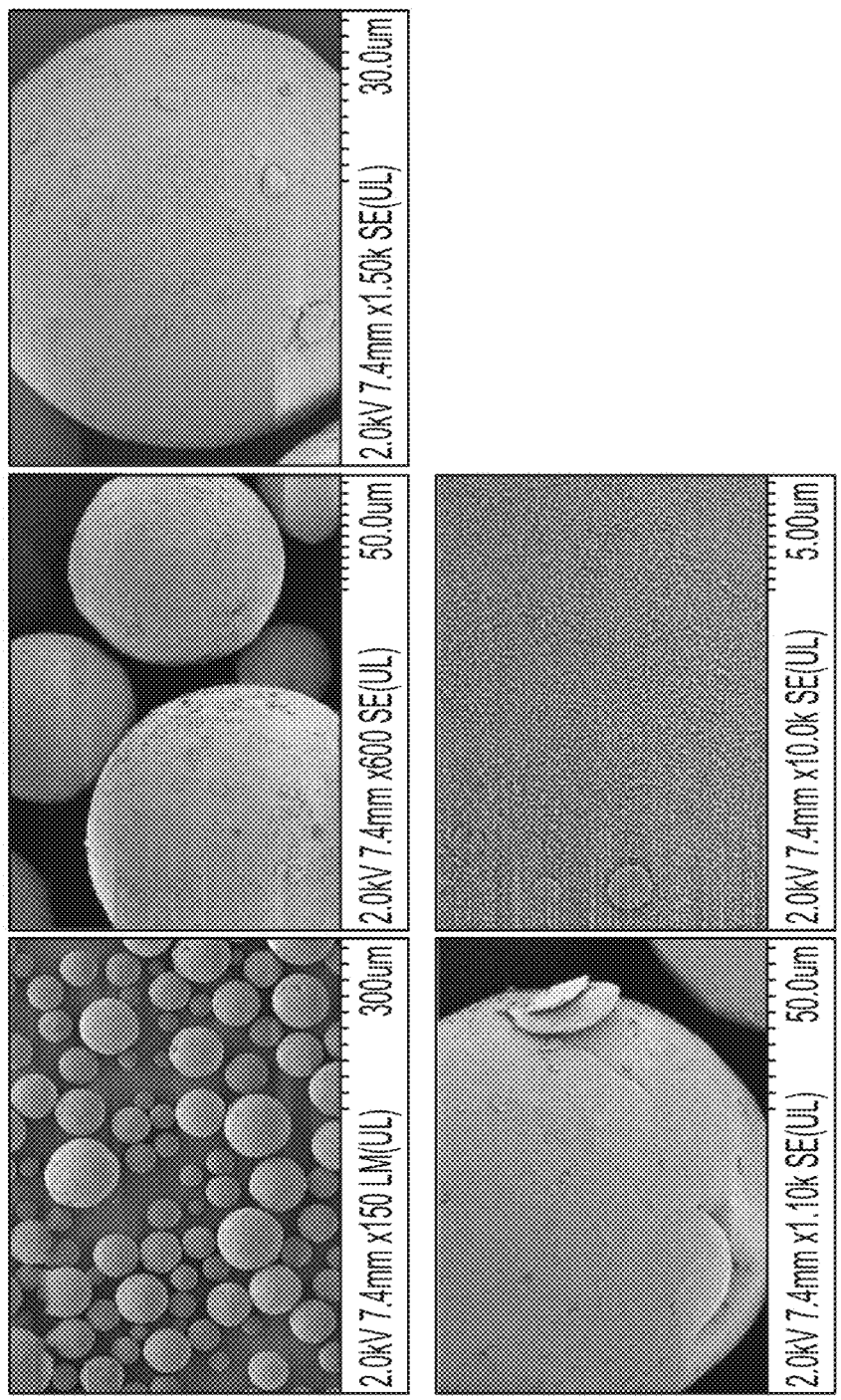
FIG. 6 includes scanning electron micrographs of polyamide particles.
Figure 7:
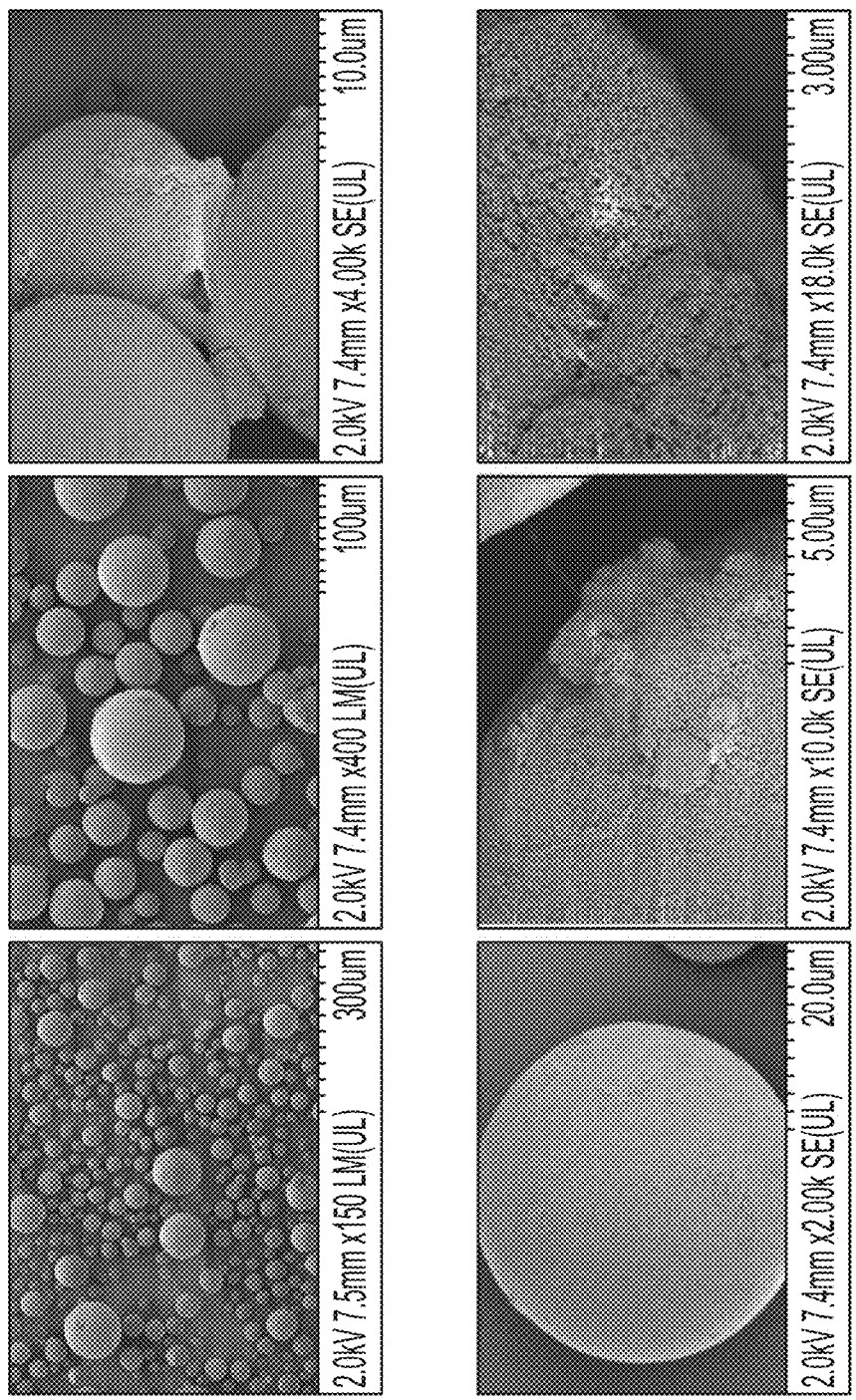
FIG. 7 includes scanning electron micrographs of polyamide particles.
Figure 8:
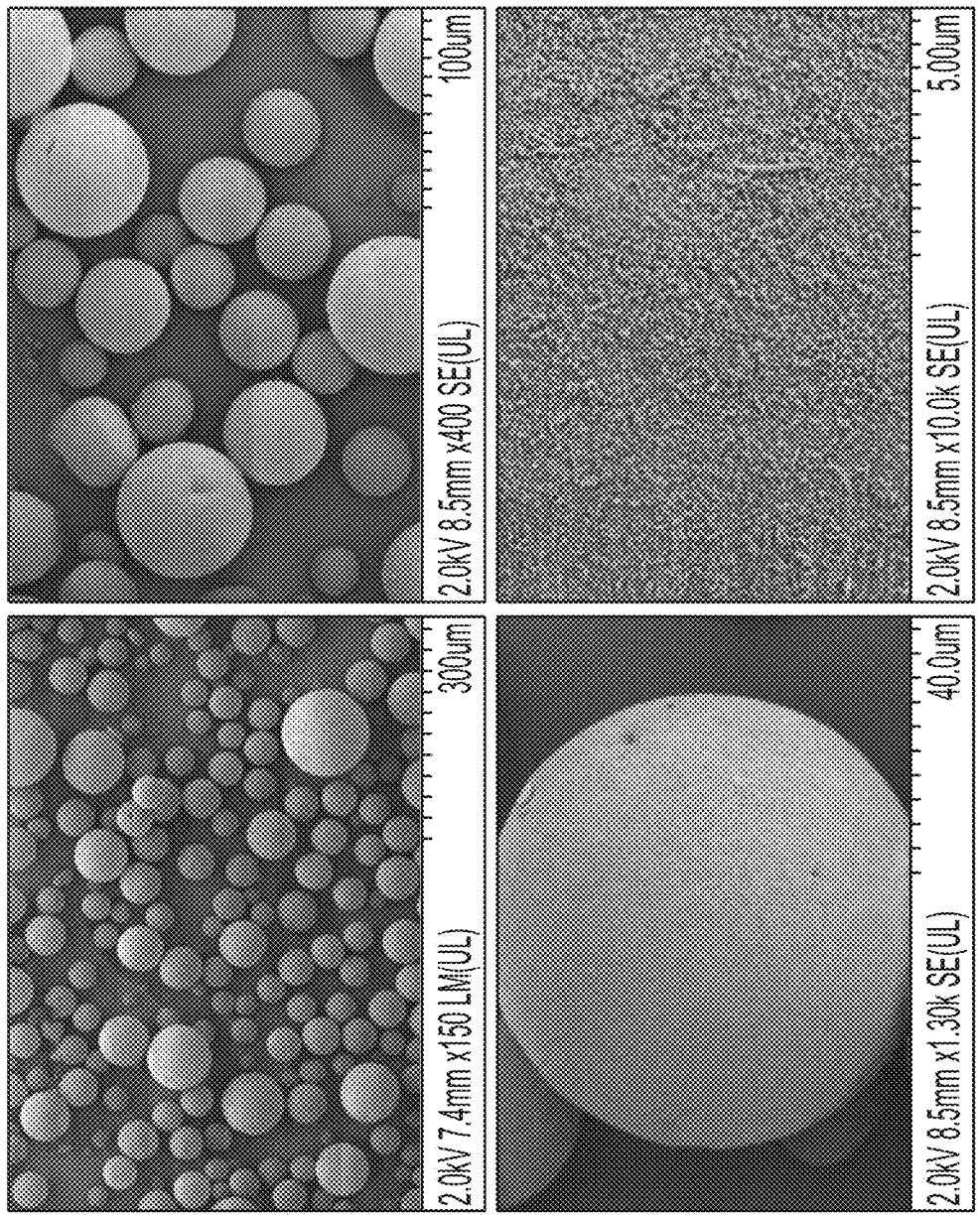
FIG. 8 includes scanning electron micrographs of polyamide particles.
Figure 9:
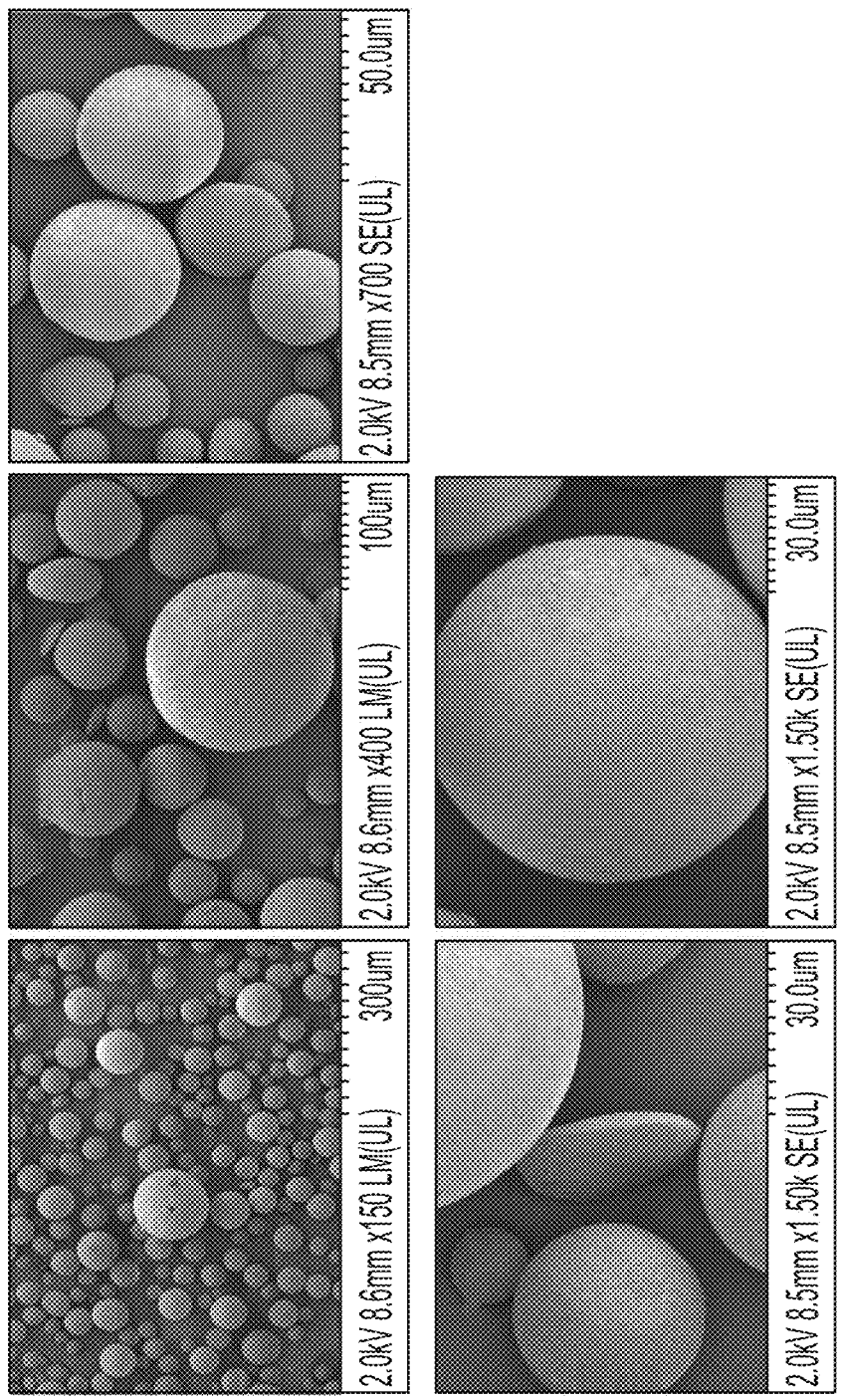
FIG. 9 includes scanning electron micrographs of polyamide particles.
Figure 10:
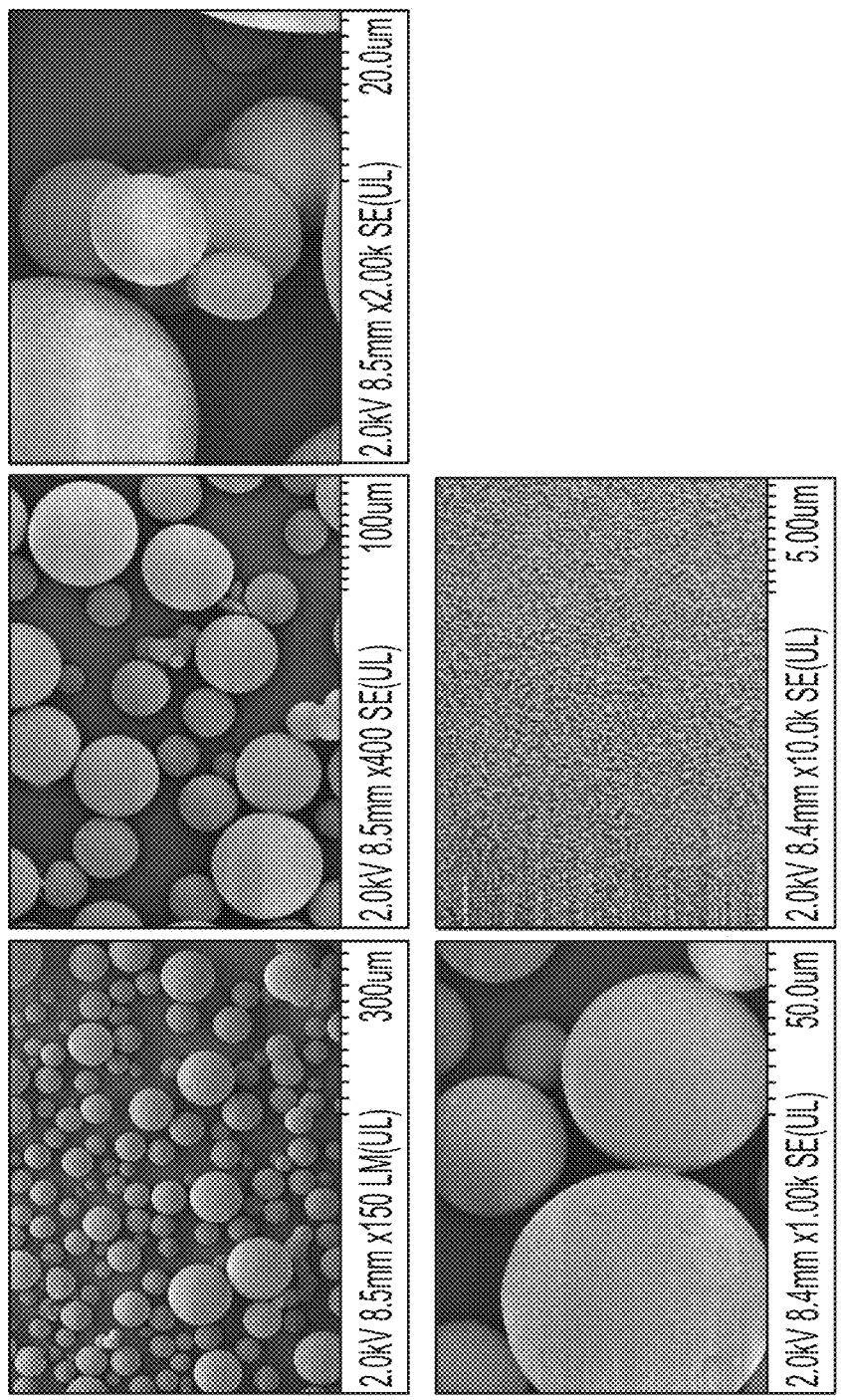
FIG. 10 includes scanning electron micrographs of polyamide particles.
Figure 11:
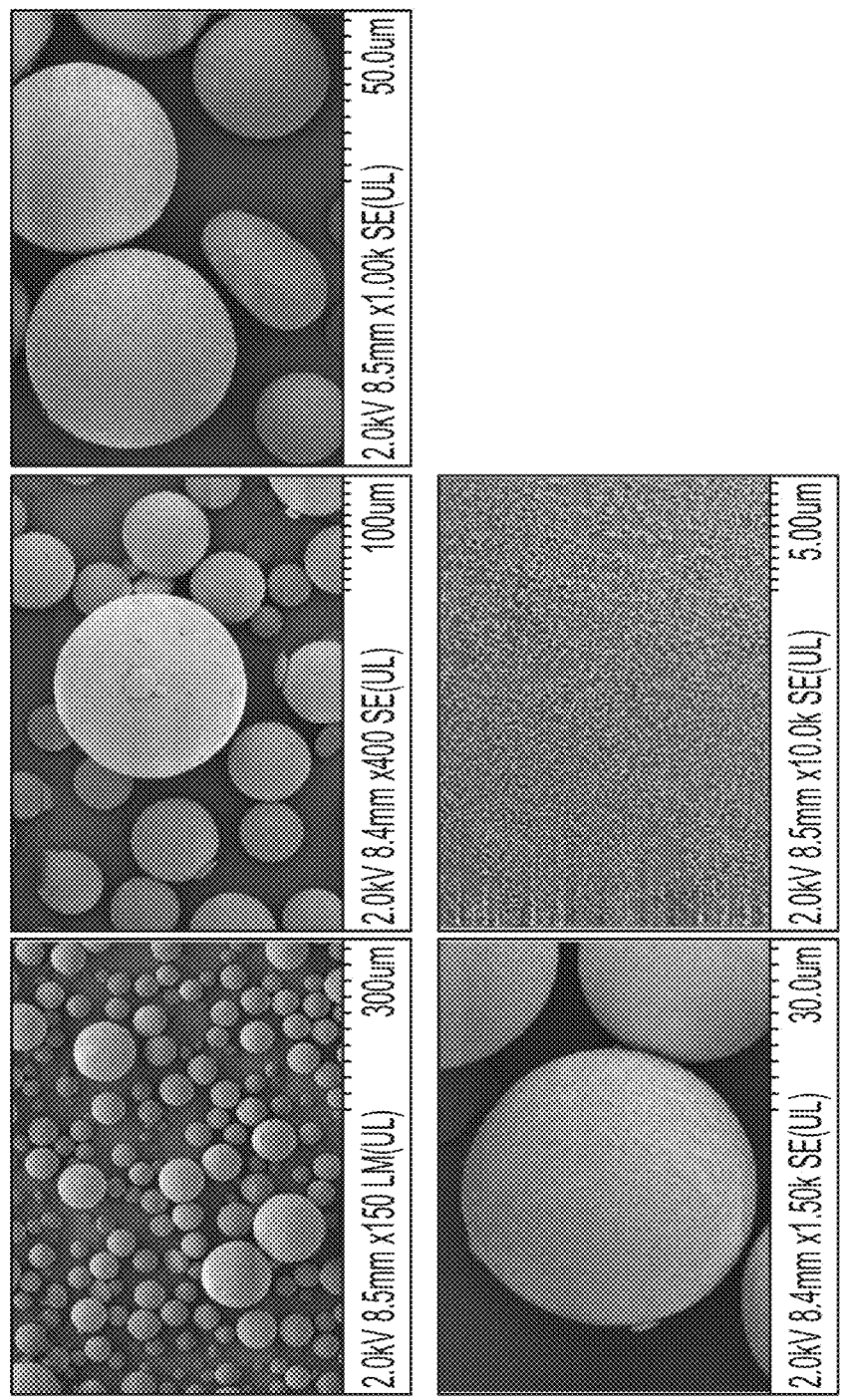
FIG. 11 includes scanning electron micrographs of polyamide particles.

FIG. 3 illustrates SEM micrographs for sample 3-4. FIG. 4 illustrates SEM micrographs for sample 3-10. FIG. 5 illustrates SEM micrographs for sample 3-15. FIG. 6 illustrates SEM micrographs for sample 3-26. FIG. 7 illustrates SEM micrographs for sample 3-30. FIGS. 8-11 illustrate SEM micrographs for samples 3-31, 3-32, 3-33, and 3-34.

This example illustrates that decreasing the concentration of silica nanoparticles in the mixture increases the particle size but decreases the diameter span (e.g., comparing 3-17 through 3-18 to 3-28 through 3-29). Further, increasing the temperature decrease the particle size but increase the diameter span (e.g., comparing 3-17 through 3-18, 3-20 through 3-21, and 3-24 through 3-25). It also appears that the time of mixing beyond about 10 minutes has minimal effect on the particle size and diameter span.

Example 4. SEM micrographs were taken of commercially available polyamide particulate material used for 3D printing, see Table 2.

TABLE 2

Figure 12:
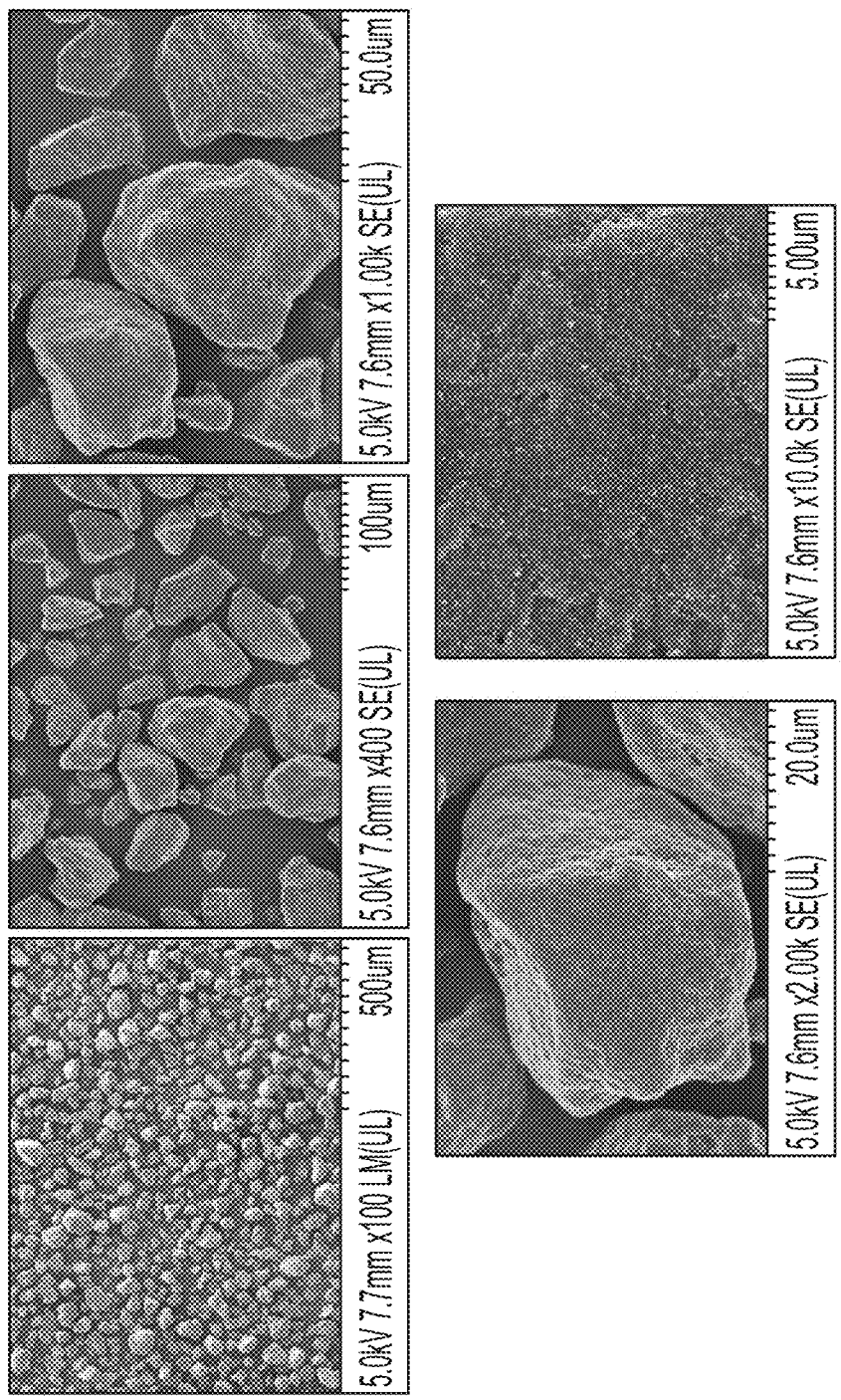
FIG. 12 includes scanning electron micrographs of polyamide particles.
Figure 13:
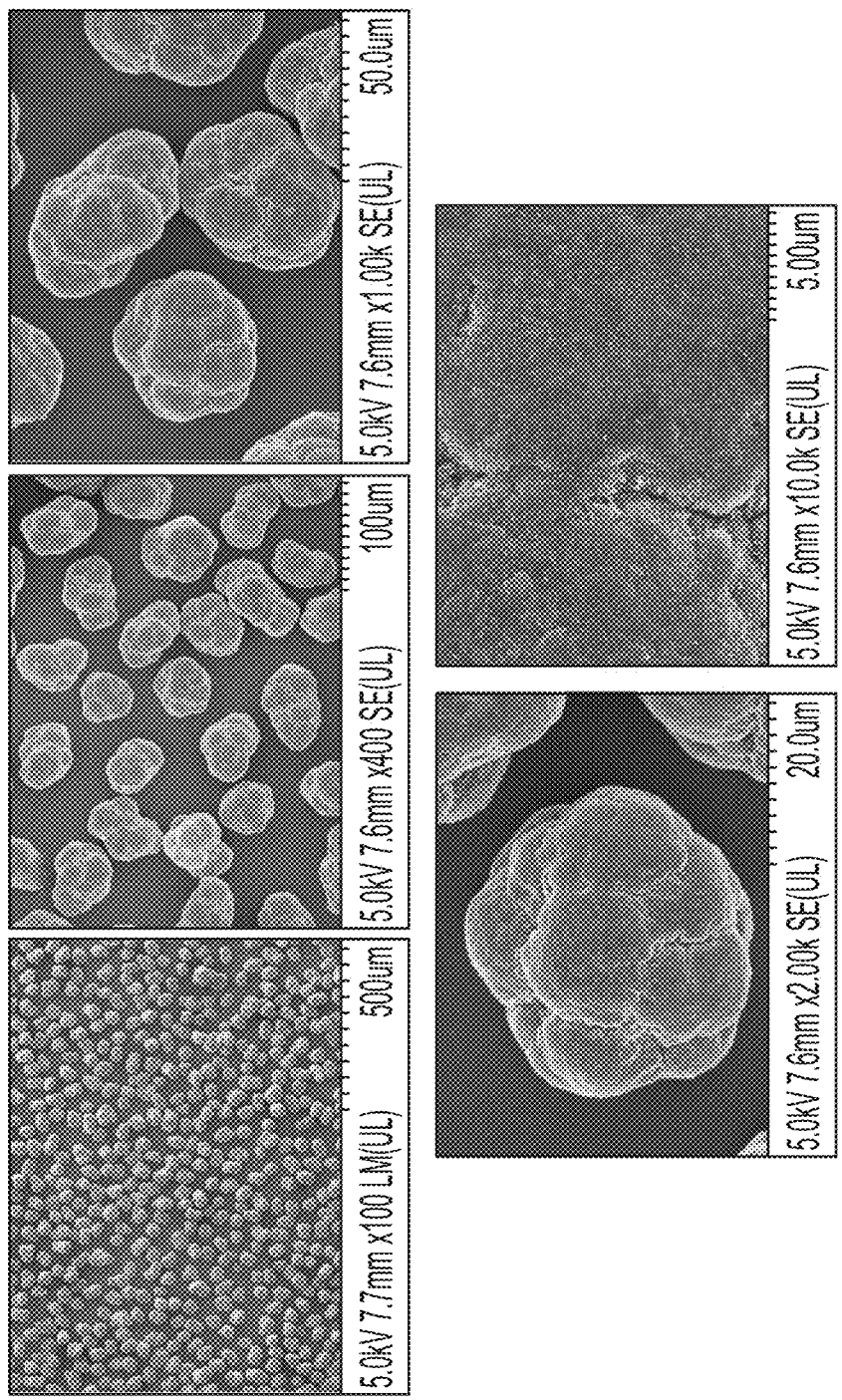
FIG. 13 includes scanning electron micrographs of polyamide particles.
Figure 14A:
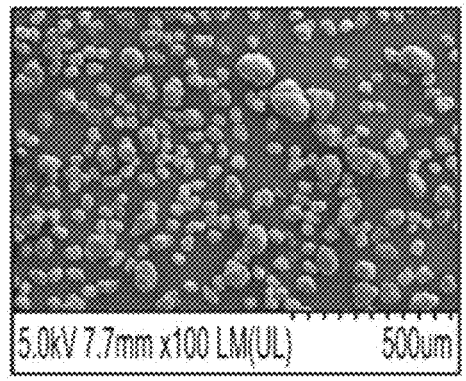
FIGS. 14A-14L include scanning electron micrographs of polyamide particles.
Figure 14B:
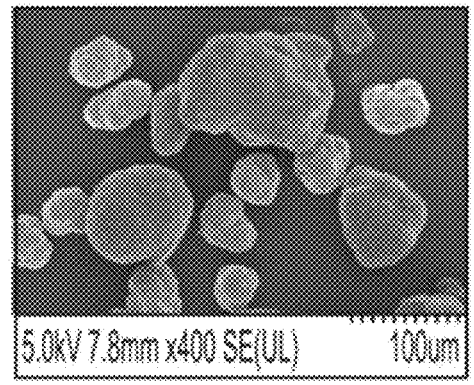
Figure 14C:
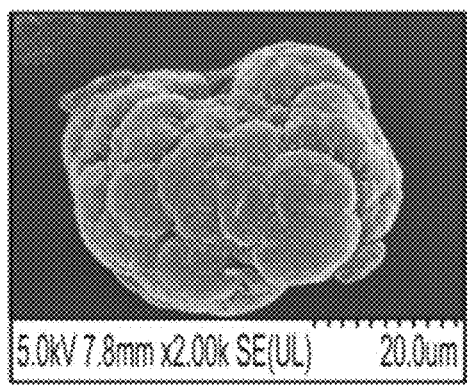
Figure 14D:
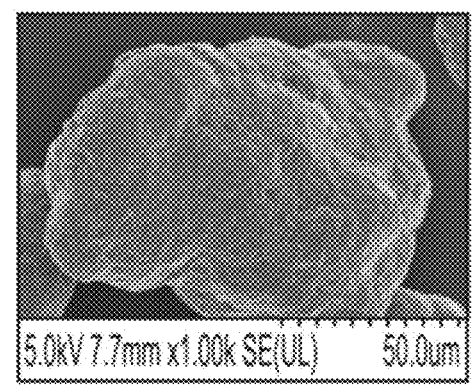
Figure 14E:
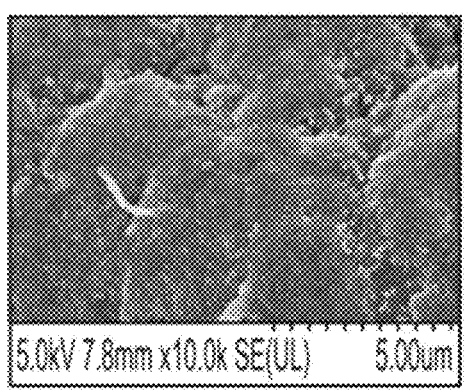
Figure 14F:
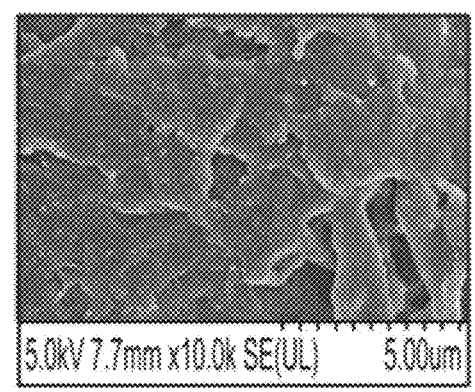
Figure 14G:
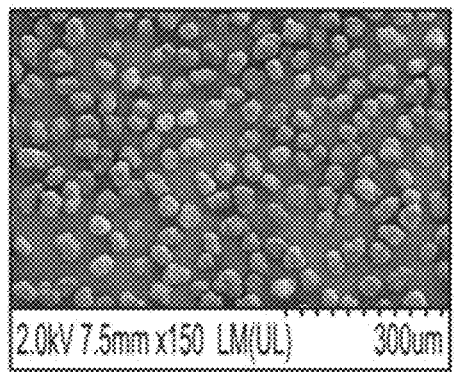
Figure 14H:
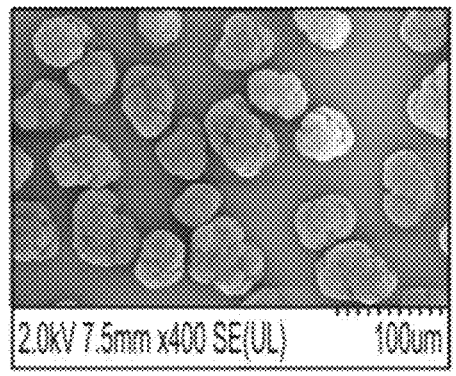
Figure 14I:
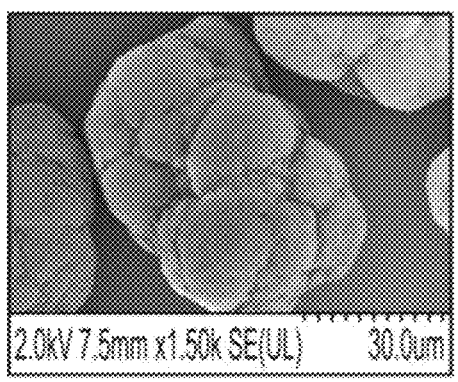
Figure 14J:
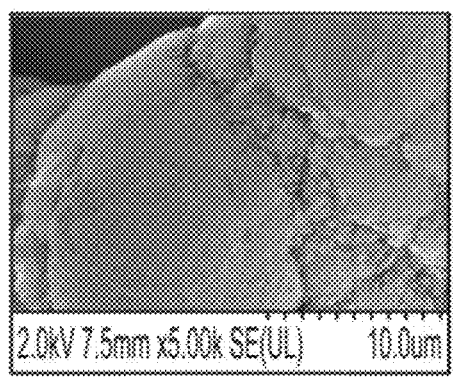
Figure 14K:
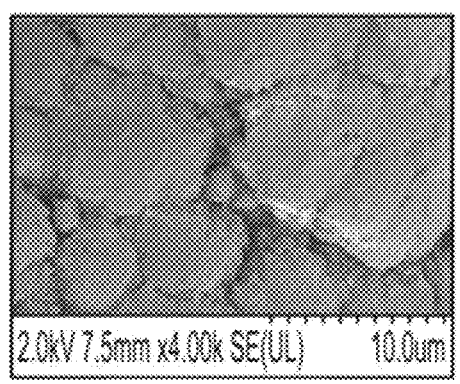
Figure 14L:
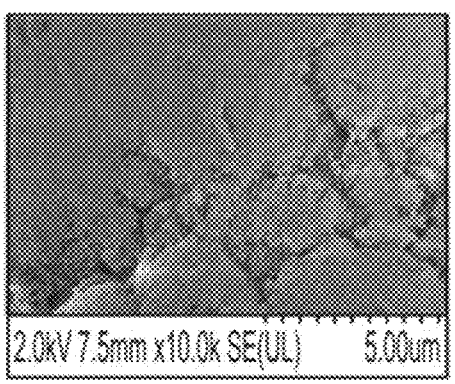
Figure 15:
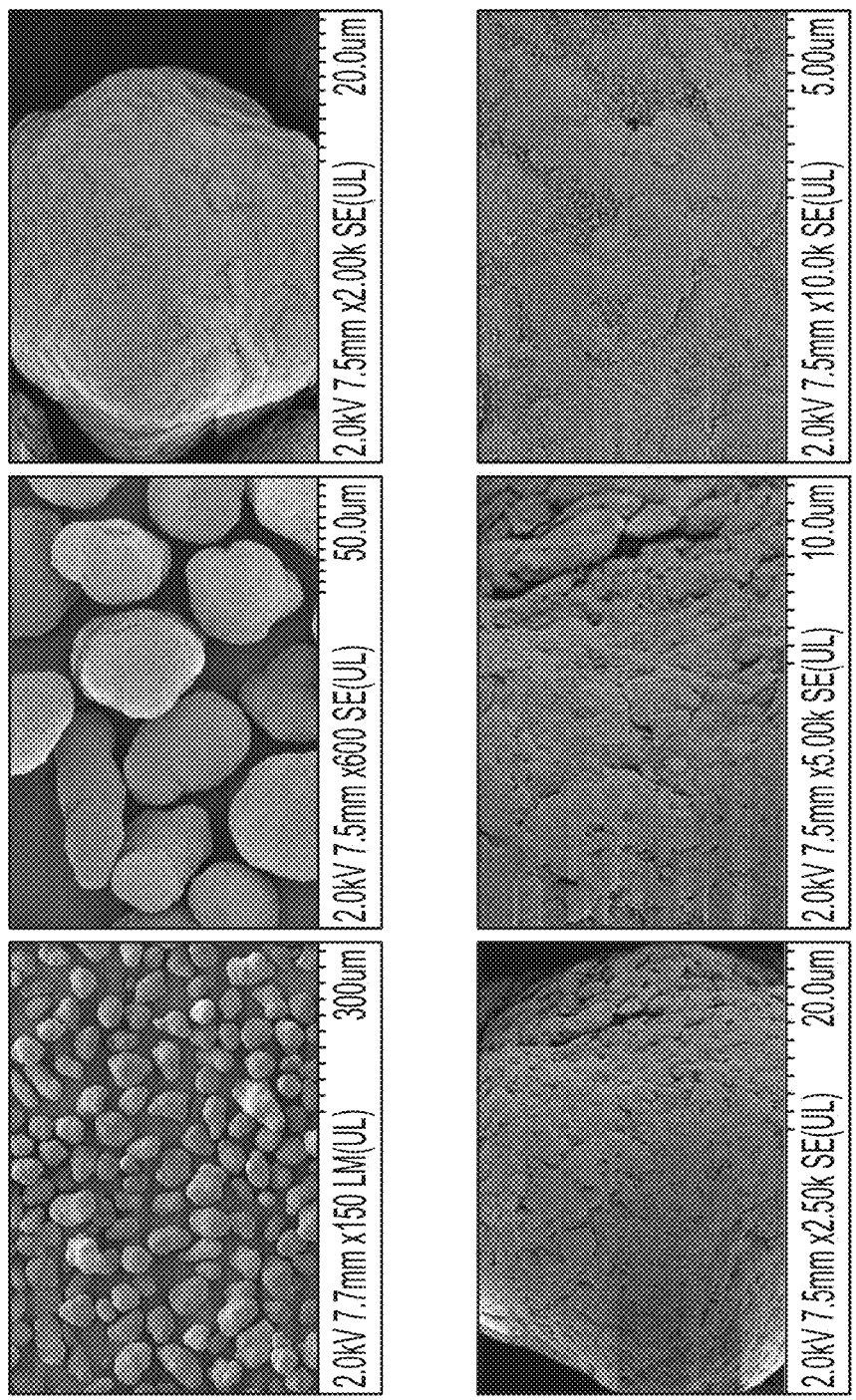
FIG. 15 includes scanning electron micrographs of polyamide particles.

| Sample | SEM Micrographs |
|---|---|
| ADSINT ™ PA11 | FIG. 12 |
| ADSINT ™ PA12L | FIG. 13 |
| ADSINT ™ PA12 | FIG. 14 |
| SINTRATEC ™ PA12 | FIG. 15 |

Comparing the SEM micrographs for the commercially available samples to those of samples 3-4, 3-10, 3-15, 3-26, 3-30, 3-31, 3-32, 3-33, and 3-34 of Example 3, the particles produced by the methods described herein have a greater circularity and higher silica nanoparticle coverage on the surface of the polyamide particles.

Example 5. Three sets of samples were prepared with polyamide 12 from RTP. 10,000 cSt PDMS, 23 wt % polyamide 12 relative to the weight of PDMS and polyamide combined, 1 wt % AEROSIL® R812S silica nanoparticles relative to the weight of the polyamide, and optionally surfactant (wt % relative to the weight of the polyamide) were placed in a glass kettle reactor. The headspace was purged with argon and the reactor was maintained under positive argon pressure. The components were heated to over 220° C. over about 60 minutes with 300 rpm stirring. At temperature, the rpm was increased to 1250 rpm. The process was stopped after 90 minutes and allowed to cool to room temperature while stirring. The resultant mixture was filtered and washed with heptane. A portion of the resultant particles was screened (scr) through a 150-μm sieve. Table 3 includes the additional components of the mixture and properties of the resultant particles.

TABLE 3

| Sample | Surfactant | Max Reactor Temp. (° C.) | Screened Particle Size (μm or unitless) | | | | Not Screened Particle Size (μm or unitless) | | | |
|---|---|---|---|---|---|---|---|---|---|---|
| | | | D10 | D50 | D90 | Span | D10 | D50 | D90 | Span |
| 5-1 | none | 223 | 16.7 | 37.4 | 77.3 | 1.62 | 16.9 | 38.7 | 122 | 2.72 |
| 5-2 | 2.5% CALFAX ® DB-45 | 226 | 44.2 | 67.7 | 105 | 0.90 | 41.4 | 68.1 | 131 | 1.32 |
| 5-3 | 1% docusate sodium | 226 | 19.2 | 43.3 | 95.8 | 1.77 | 19.4 | 48.8 | 207 | 3.84 |

Figure 16:
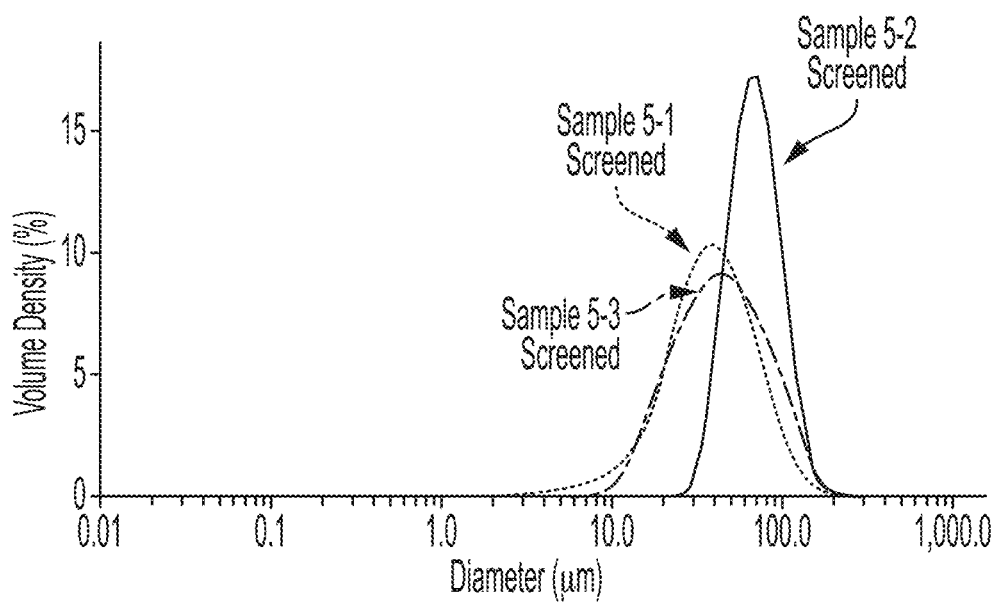
FIGS. 16 and 17 are the volume density particle size distribution for the particles screened and not screened, respectively.
Figure 17:
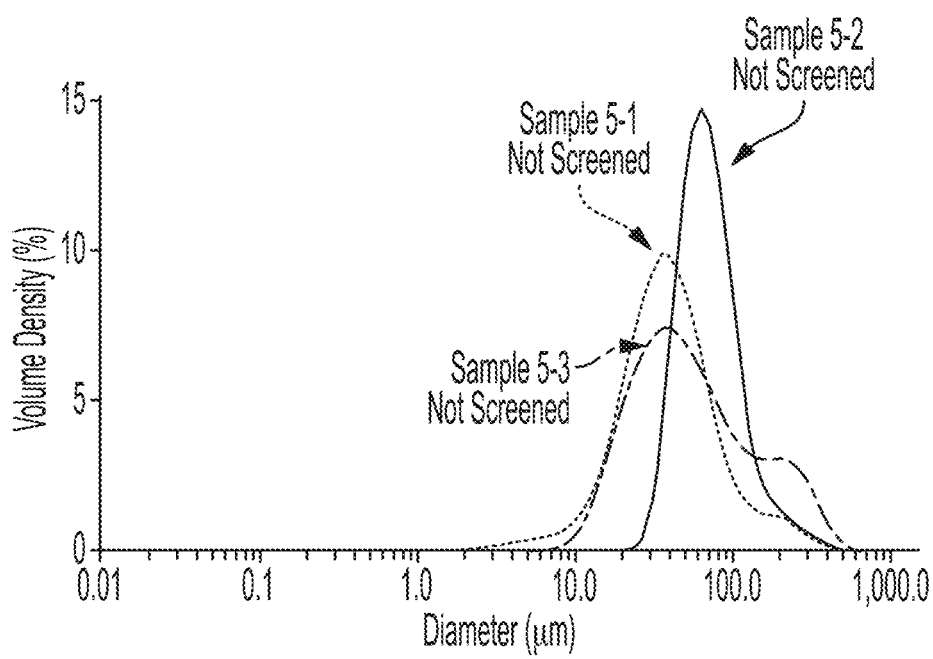

FIGS. 16 and 17 are the volume density particle size distribution for the particles screened and not screened, respectively.

This example illustrates that the inclusion of surfactant and the composition of said surfactant can be another tool used to tailor the particle characteristics.

Example 6. Polyamide 12 microparticles were produced in a 25 mm twin-screw extruder (Werner & Pfleiderer ZSK-25). The carrier fluid was PDMS oil with 60,000 cSt viscosity at room temperature. The concentrations of components in the final mixture in the extruder are provided in Table 4. The polymer pellets were added to the extruder, brought to temperature, and then preheated carrier fluid having silica nanoparticles dispersed therein added to the molten polymer in the extruder. Other operational parameters are provided in Table 4. Then, the mixture was discharged into a container and allowed to cool to room temperature over several hours. The light scattering particle size data is also provided in Table 4.

TABLE 4

| Sample | Screw RPM | Extruder Temp (° C.) | wt % PA* | wt % silica** | Silica | D10 (μm) | D50 (μm) | D90 (μm) |
|---|---|---|---|---|---|---|---|---|
| 6-1 | 1000 | 280 | 45% | 0.20% | R812S | 38.6 | 60.2 | 93.2 |
| 6-2 | 1000 | 280 | 45% | 0.20% | R812S | 31.5 | 47.9 | 72.1 |
| 6-3 | 1000 | 280 | 45% | 0.10% | R812S | 24.7 | 39.3 | 62.8 |
| 6-4 | 250 | 280 | 45% | 0.10% | R812S | 31 | 48.4 | 75.6 |
| 6-5 | 1000 | 280 | 35% | 0.10% | R812S | 19.9 | 35 | 62.6 |
| 6-6 | 1000 | 280 | 35% | 0.75% | X24*** | 15.9 | 27.7 | 54.1 |
| 6-7 | 1000 | 280 | 40% | 0.75% | X24 | 19.2 | 32.3 | 60.5 |
| 6-8 | 1000 | 270 | 30% | 0.25% | R812S | 21.6 | 34.4 | 53.7 |
| 6-9 | 1000 | 290 | 30% | 0.25% | R812S | 16.8 | 29.7 | 53.7 |
| 6-10 | 1000 | 290 | 30% | 0.75% | X24 | 17 | 29.6 | 52.6 |
| 6-11 | 1000 | 270 | 30% | 0.75% | X24 | 17.5 | 30.1 | 54.2 |
| 6-12 | 250 | 250 | 30% | 0.50% | R812S | 23.1 | 36.9 | 57.8 |
| 6-13 | 1000 | 250 | 30% | 0.50% | R812S | 20.6 | 34.1 | 56.4 |
| 6-14 | 500 | 250 | 30% | 0.50% | R812S | 22.9 | 39.8 | 71 |

TABLE 4-continued

| Sample | Screw RPM | Extruder Temp (° C.) | wt % PA* | wt % silica** | Silica | D10 (μm) | D50 (μm) | D90 (μm) |
|---|---|---|---|---|---|---|---|---|
| 6-15 | 500 | 250 | 30% | 0.50% | R812S | 21.3 | 36.6 | 63.2 |
| 6-16 | 250 | 290 | 30% | 1% | R812S | 16 | 25.3 | 39 |
| 6-17 | 1000 | 290 | 30% | 1% | R812S | 14.5 | 22 | 33.1 |
| 6-18 | 250 | 250 | 30% | 1% | R812S | 21.3 | 33 | 50.6 |
| 6-19 | 1000 | 250 | 30% | 1% | R812S | 18.6 | 28.3 | 43.4 |

*relative to the total combined weight of PDMS oil and polyamide
**relative to the weight of polyamide
***X24 is a silica powder available from ShinEtsu having an average particle size of 0.1 μm, a specific gravity of 1.8, and a water content of 2%.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is the following:

1. A composition comprising:
   particles having an outer surface and a circularity of 0.90 or greater, and comprising:
      a polyamide, and
      silica nanoparticles associated with the outer surface of the particles;
         wherein the silica nanoparticles are hydrophobically modified.

2. The composition of claim 1, wherein at least some of the silica nanoparticles are embedded in the outer surface of the particles.

3. The composition of claim 1, wherein the polyamide is present at 90 wt % to 99.5 wt % of the particles.

4. The composition of claim 1, wherein the particles further comprise a second thermoplastic polymer in addition to the polyamide.

5. The composition of claim 4, wherein the particles further comprise a compatibilizer.

6. The composition of claim 1, wherein the polyamide is selected from the group consisting of polycaproamide, poly (hexamethylene succinimide), polyhexamethylene adipamide, polypentamethylene adipamide, polyhexamethylene sebacamide, polyundecamide, polydodecamide, polyhexamethylene terephthalamide, nylon 10,10, nylon 10,12, nylon 10,14, nylon 10,18, nylon 6,12, nylon 6,14, nylon 12,12, a semi-aromatic polyamide, an aromatic polyamide, polyesteramide, polyetheresteramide, polycarbonate-esteramide, polyether-block-amide elastomers, any copolymer thereof, and any combination thereof.

7. The composition of claim 1, wherein the particles have a D10 of about 0.5 μm to about 125 μm, a D50 of about 1 μm to about 200 μm, and a D90 of about 70 μm to about 300 μm, wherein D10<D50<D90.

8. The composition of claim 1, wherein the particles have a diameter span of about 0.2 to about 10.

9. The composition of claim 1, wherein the particles have a Hausner ratio of about 1.0 to about 1.5.

10. The composition of claim 1, wherein the silica nanoparticles have a D50 of about 10 nm to about 150 nm.

11. The composition of claim 1, wherein the silica nanoparticles have a D50 of about 25 nm to about 100 nm.

12. A composition comprising:
   particles having an outer surface and a circularity of 0.90 or greater, and comprising:
      a polyamide,
      an internal additive, and
      oxide nanoparticles associated with the outer surface of the particles.

13. The composition of claim 12, wherein the internal additive comprises an entry selected from the group consisting of a filler, a pigment, and a pH regulator.

14. The composition of claim 12, wherein the internal additive comprises a filler selected from the group consisting of glass fibers, glass particles, mineral fibers, carbon fibers, oxide particles, and metal particles.

15. A composition comprising:
   particles having an outer surface and a circularity of 0.90 or greater, and comprising:
      a polyamide, and
      silica nanoparticles associated with the outer surface of the particles;
         wherein the silica nanoparticles are hydrophilically modified.

16. The composition of claim 15, wherein the silica nanoparticles have a D50 of about 10 nm to about 150 nm.

17. The composition of claim 15, wherein the silica nanoparticles have a D50 of about 25 nm to about 100 nm.

18. A method comprising:
depositing the composition of claim 1 upon a surface in a specified shape; and
once deposited, heating at least a portion of the particles to promote consolidation thereof to form a consolidated body comprising the polyamide.

19. The method of claim 18, wherein consolidation takes place with a laser.

20. The method of claim 18, wherein the consolidated body has a void percentage of about 1% or less after consolidation.

\* \* \* \* \*